United States Patent [19]

Uematsu et al.

[11] Patent Number: 4,994,812
[45] Date of Patent: Feb. 19, 1991

[54] ANTENNA SYSTEM

[75] Inventors: Masahiro Uematsu; Ryuichi Hiratsuka, both of Otemachi; Kazuro Kato, Yokohama, all of Japan

[73] Assignees: Nippon Steel Corporation, Tokyo; System Uniques Corporation, Kanagawa, both of Japan

[21] Appl. No.: 449,671

[22] Filed: Dec. 12, 1989

[30] Foreign Application Priority Data

Dec. 13, 1988 [JP] Japan .............................. 63-314541
Jan. 10, 1989 [JP] Japan .................................. 1-3071
Mar. 24, 1989 [JP] Japan ................................ 1-72187

[51] Int. Cl.$^5$ .............................................. G01S 3/46
[52] U.S. Cl. ................................................. 342/359
[58] Field of Search ............... 343/765; 342/75, 359, 342/442

[56] References Cited

U.S. PATENT DOCUMENTS

| | | | |
|---|---|---|---|
| 2,480,829 | 9/1949 | Barrow et al. | 343/765 |
| 3,025,515 | 3/1962 | Fairbanks | 343/765 |
| 3,133,283 | 5/1964 | Ghose . | |
| 3,316,548 | 4/1967 | D'Amico | 342/75 |
| 4,090,201 | 5/1978 | Whitman, Jr. | 342/75 X |
| 4,346,386 | 8/1982 | Francis et al. | 343/765 |
| 4,348,676 | 9/1982 | Tom . | |
| 4,443,801 | 4/1984 | Klose et al. . | |
| 4,638,320 | 1/1987 | Eggert et al. . | |
| 4,725,843 | 2/1988 | Suzuki et al. . | |

FOREIGN PATENT DOCUMENTS 0106178  4/1984  European Pat. Off. .

OTHER PUBLICATIONS

I.E.E.E. Transactions on Broadcasting, vol. 35, No. 1, Mar. 1989, pp. 56-61, New York, U.S.A., Ito et al., A Mobile 12 GHz DBS Television Receiving System.
Microwave Journal, vol. 30, No. 7, Jul. 1987, pp. 125, 130, Norwood, Mass., U.S.A.; Jackson et al., Low Cost, KA-Band Microstrip Patch Monopulse Antenna.

Primary Examiner—Mark Hellner
Attorney, Agent, or Firm—Sughrue, Mion, Zinn, Macpeak & Seas

[57] ABSTRACT

A satellite tracking antenna system comprises three or four plane antennas juxtaposed on a single plane. A first and a second antenna are juxtaposed in an azimuth direction, and a phase difference between signals received by these antennas is detected in order to determine a declination of an antenna unit with respect to the satellite as viewed in the azimuth direction. The first and a third antenna are juxtaposed in an elevation direction, and a phase difference between signals received by these antennas is detected to determine a declination of the antenna unit with respect to the satellite as viewed in the elevation direction. The antenna unit is driven so as to reduce these declinations to zero. Stated differently, values of a sine and a cosine function are extracted which have a phase difference between signals received by a pair of antennas as a parameter, and a tangent value representing the ratio therebetween is calculated and is then inversely converted to provide phase difference information.

9 Claims, 20 Drawing Sheets

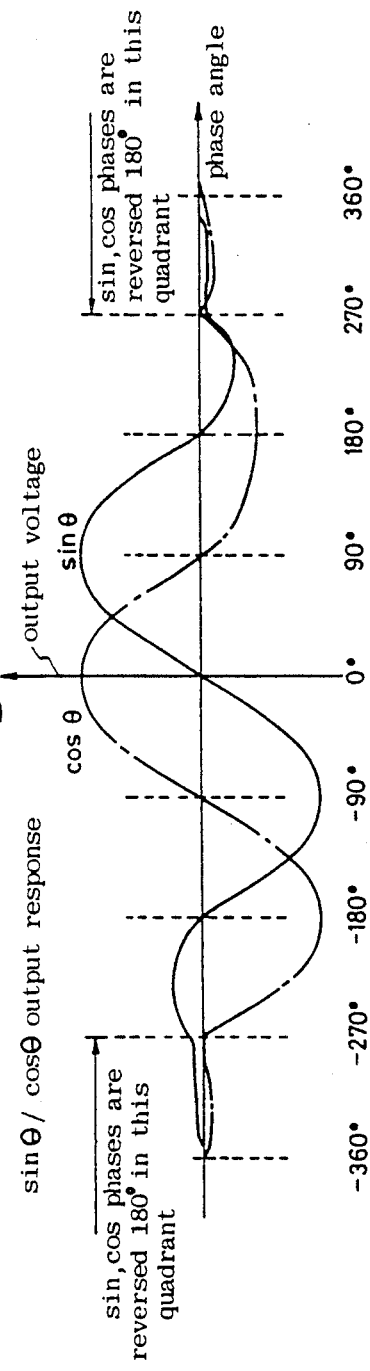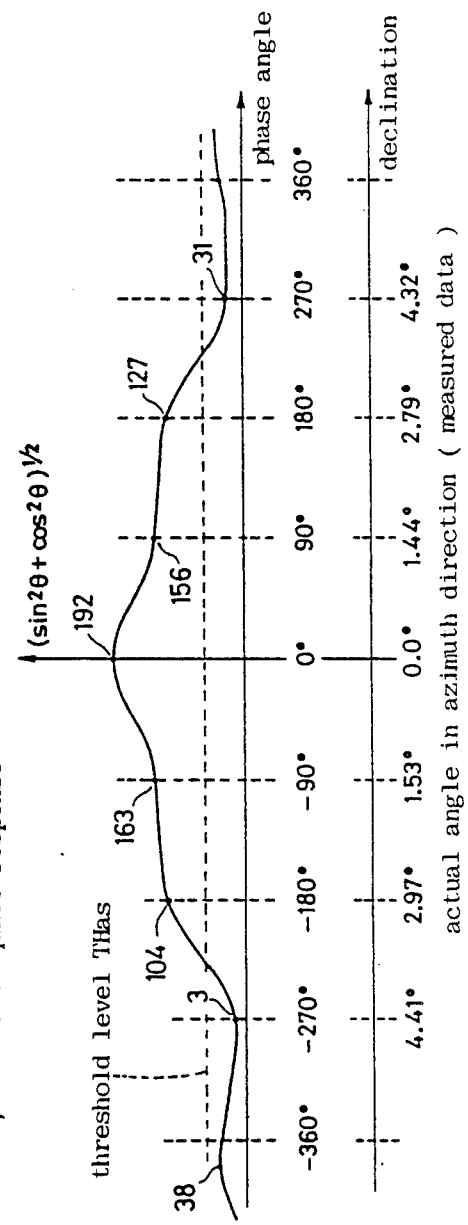

lissajou's figure for sinθ and cosθ polarity | revolution data | quadrant data angle data in unit of $90°/2^n$

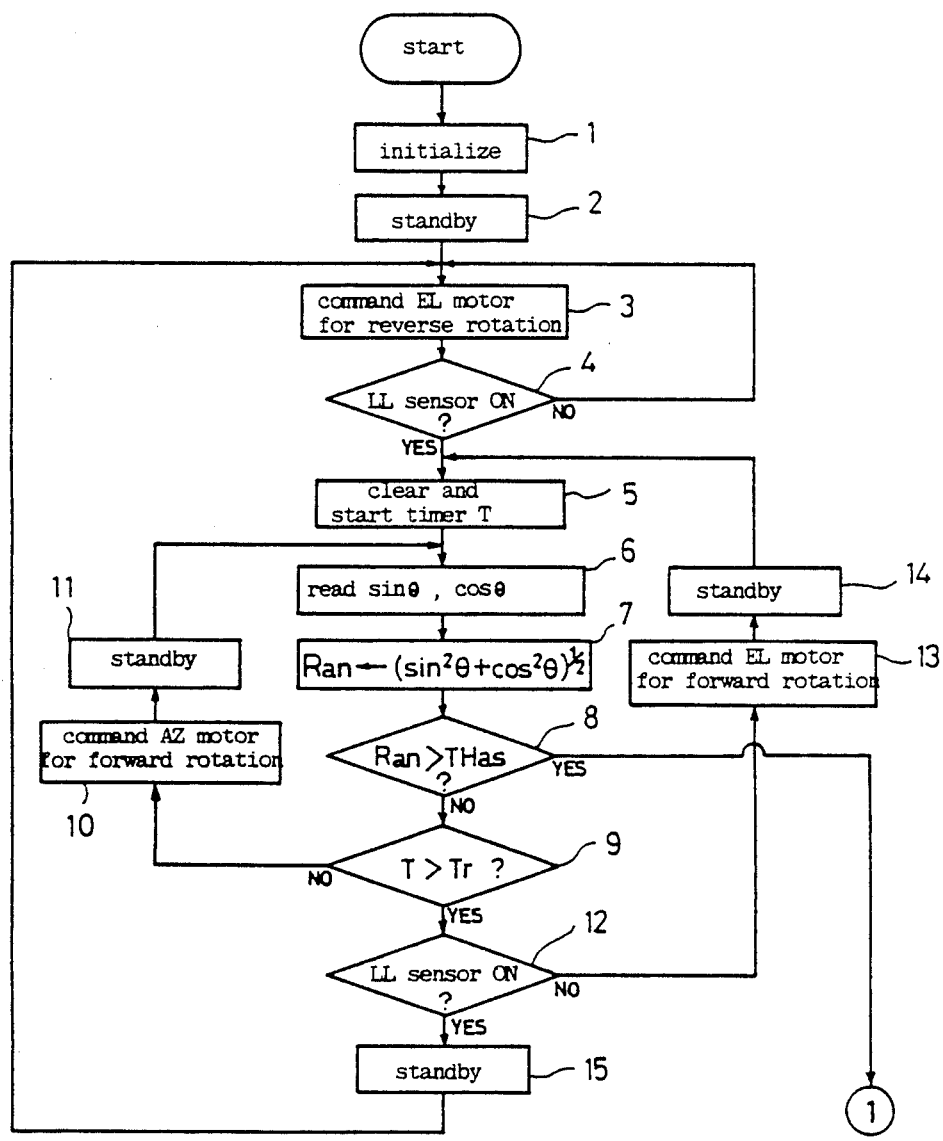

ANTENNA SYSTEM

FIELD OF THE INVENTION

The invention relates to an attitude control which maintains an antenna within a system which is adapted to be moving with respect to a station or to a source of radio wave, as directed to such station or source, and in particular, while not intended to be limited thereto, to the attitude control of an antenna as mounted on a moving body such as an automobile so as to be directed toward a static satellite.

The present inventors have previously proposed a patent application covering such antenna system in the United States, Canada, Europe, Korea and other countries, as identified below:

The United States: application Ser. No. 07/336,991, filed Apr. 11, 1989;
Canada: Application Ser. No. 596,269 filed Apr. 10, 1989;
Europe: EPC Application Ser. No. 89106355.4, filed Apr. 11, 1989; and
Korea: Application Ser. No. 89-4809, filed Apr. 12, 1989.

The present invention relates to an improvement over such antenna system.

THE PRIOR ART

Since the advent of a satellite broadcasting, it is desired to receive a radio wave from the satellite by a moving body such as an automobile, in addition to the reception at a stationary building. It will be seen that this requires an attitude control of an antenna because a high gain antenna or an antenna having a sharply defined directivity is required to catch a weak radio wave from a broadcasting satellite (a target station or source of radio wave).

The attitude control of an antenna includes a passive control which is utilized to maintain an antenna attitude which is established during the initialization, and an active control which tracks the broadcasting satellite by detecting the direction of an oncoming radio wave in a sequential manner.

An arrangement for the former is disclosed in Japanese Patent Publication No. 28,244/1986 disclosing an antenna system for satellite communication in which the spinning stability of a flywheel is utilized for the control which maintains an antenna attitude. A flywheel of an increased weight and hence having a greater inertia is required to obtain an increased reception stability.

An arrangement for the latter is disclosed in U.S. Pat. No. 4,035,805 issued to Graham and U.S. Pat. No. 4,725,843 issued to Suzuki et al in which an antenna attitude is altered independence upon a relative change in the direction of an oncoming radio wave, and hence a reception stability is achieved by an electrical control system. Thus, in contrast to the former arrangement, it is necessary that the inertia of a mechanical system be reduced to achieve a rapid response, which is advantageous for an arrangement which is adapted to be mounted on a small moving body such as an automobile.

The active control includes a consecutive lobing scheme in which the attitude of a single antenna is consecutively varied to detect the direction in which a maximum reception level is found, and a concurrent lobing scheme in which a plurality of antennas are used to determine the direction of an oncoming radio wave based on phase differences between signals received by the individual antennas. It will be seen that the latter scheme will be superior to the former for the reception of a satellite broadcasting by a small moving body such as an automobile due to the absence of a mechanical oscillation or fading which is attributable to a consecutive change in the antenna attitude.

The concurrent lobing scheme can be further divided into one which utilizes the amplitude component of signals received by the individual antennas and another utilizing the phase component thereof. In the former arrangement, the individual antennas are arranged to exhibit directivities which are slightly different from each other, so that the direction of an oncoming radio wave can be detected by a comparison of the levels of the individual signals received. This arrangement is susceptible to the effects of the accuracy of disposing the individual antennas and their responses as well as the influence of the electrical characteristics of an associated signal processing circuit. In this respect, a physical relationship or the spacing between the individual antennas represents a major parameter in the latter arrangement, allowing a stabilized control to be obtained.

By way of example, consider the detection of a phase difference between signals which are received by a pair of antennas. One of the signals received may be multiplied by the other signal, or by the other signal which is phase shifted by 90° to produce a d.c. component which represents a value of cosine or sine function of a lagging phase of the other signal with respect to said one signal (if the lagging phase turns to be a negative value, this represents a leading phase, and hence such phase will be inclusively referred to as a phase angle). It will be seen that the phase angle results from a difference in the path length for the radio wave to reach the pair of antennas, or an angle of declination of the direction represented by the directivity of the antenna from the direction of the oncoming radio wave, thus reflecting such declination. Accordingly, the declination of the directivity of the antenna with respect to the direction of an oncoming radio wave may be determined on the basis of such value.

However, it will be seen that the value of the cosine or sine function depends on the levels of the both signals received, and hence the greater a change in the gain of the antenna with respect to a change in the declination (or the higher the directivity of the antenna), the greater a change in the reception level will be with respect to a change in the declination, giving rise to an error of measurement. In other words, a non-linearity of the antenna gain as a function of the declination causes an error in the measured value of the declination.

SUMMARY OF THE INVENTION

The invention has for its first object the provision of an antenna system which accurately detectS a declination of a direction as represented by the directivity of an antenna with respect to a target station or a source of radio wave on a moving body, and has for its second object the provision of an antenna system which accurately tracks a target station or a source of radio wave on a moving body.

The above objects are accomplished in accordance with the invention by providing a first and a second plane antenna on a common plane. Signals received by the respective antennas are used to calculate a ratio of a sine or cosine function including a phase difference as a parameter, and such ratio is used to determine a declination of a direction represented by the directivity of the first and the second plane antenna with respect to the direction on which a target station or a source of radio wave is located. Each of the first and the second plane antennas exhibits a high gain in a direction perpendicular to the common plane, and exhibits a low gain in a direction which deviates largely from such perpendicular direction. As a result of such directivity response, the reception level of the first and the second plane antennas shifts in a manner corresponding to the declination, as does the value of the sine and cosine function. However, it is to be understood that the ratio remains substantially unchanged, and corresponds to the phase difference. Accordingly, in accordance with the invention, the declination can be accurately determined without any substantial influence of the directivities of the first and the second plane antennas.

It will be noted that the ratio of a sine and a cosine function, for example, a tangent function varies over a range from 0° to 90°, and therefore it is necessary to determine a quadrant in which they reside. According to the invention, the quadrant is determined based on the positive or negative polarity of the sine and the cosine function.

Other objects and features of the invention will become apparent from the following description of several embodiments thereof with reference to the attached drawings.

BRIEF DESCRIPTION OF THE DRAWINGS

FIG. 1b is a block diagram of a signal processing circuit 4 shown in FIG. 1a;

FIG. 4a graphically shows two sets of azimuth error signals which are output from the circuit 45 shown in FIG. 1c;

FIG. 4b graphically shows a mean square of the error signals;

FIGS. 6a, 6b, 6c, 6d and 6e are flow charts illustrating the operation of the control circuit 5 shown in FIG. 1a during the attitude control of antennas;

FIG. 7b is a block diagram of an error signal detection circuit 43 shown in FIG. 7a;

FIG. 9b is a block diagram of an error signal detection circuit 43 shown in FIG. 9a.

FIRST EMBODIMENT

Figure 1A:
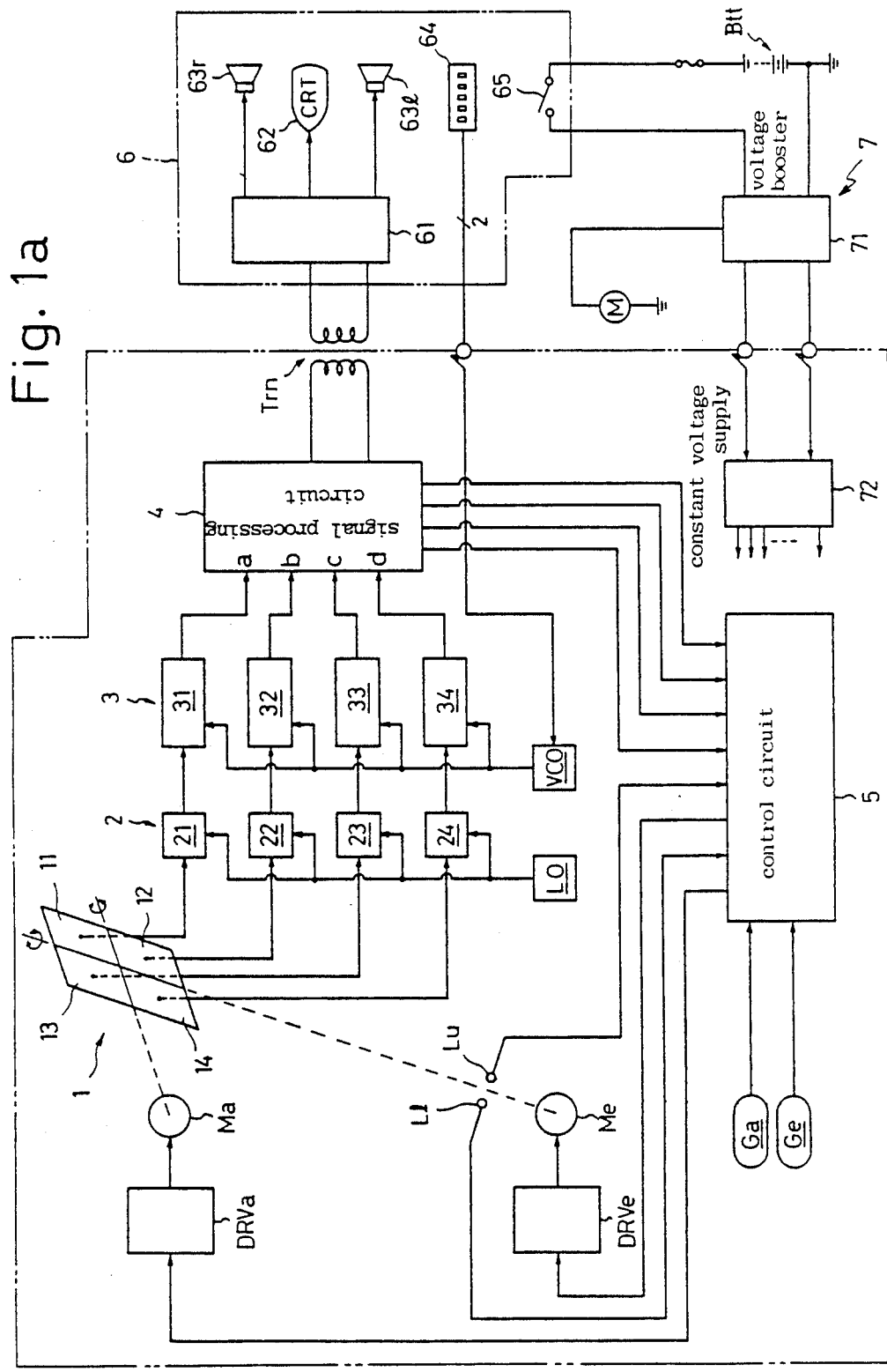
FIG. 1a is a block diagram of a satellite broadcasting reception system mounted on an automobile as constructed according to one embodiment of the invention.

Referring to FIG. 1a, there is shown a first embodiment of the invention utilizing an onboard battery Btt as a power supply. This embodiment includes four plane antennas 11, 12, 13 and 14 to form a mobile reception system which tracks a broadcasting satellite by detecting a declination of the directivity or the orientation indicated by a main lobe of each plane antenna with respect to the direction of an oncoming radio wave or the direction on which a broadcasting satellite is located, on the basis of phase differences between signals received by the individual antennas. A satellite broadcasting received is output to a television set 6 which is installed within an automobile.

Figure 2A:
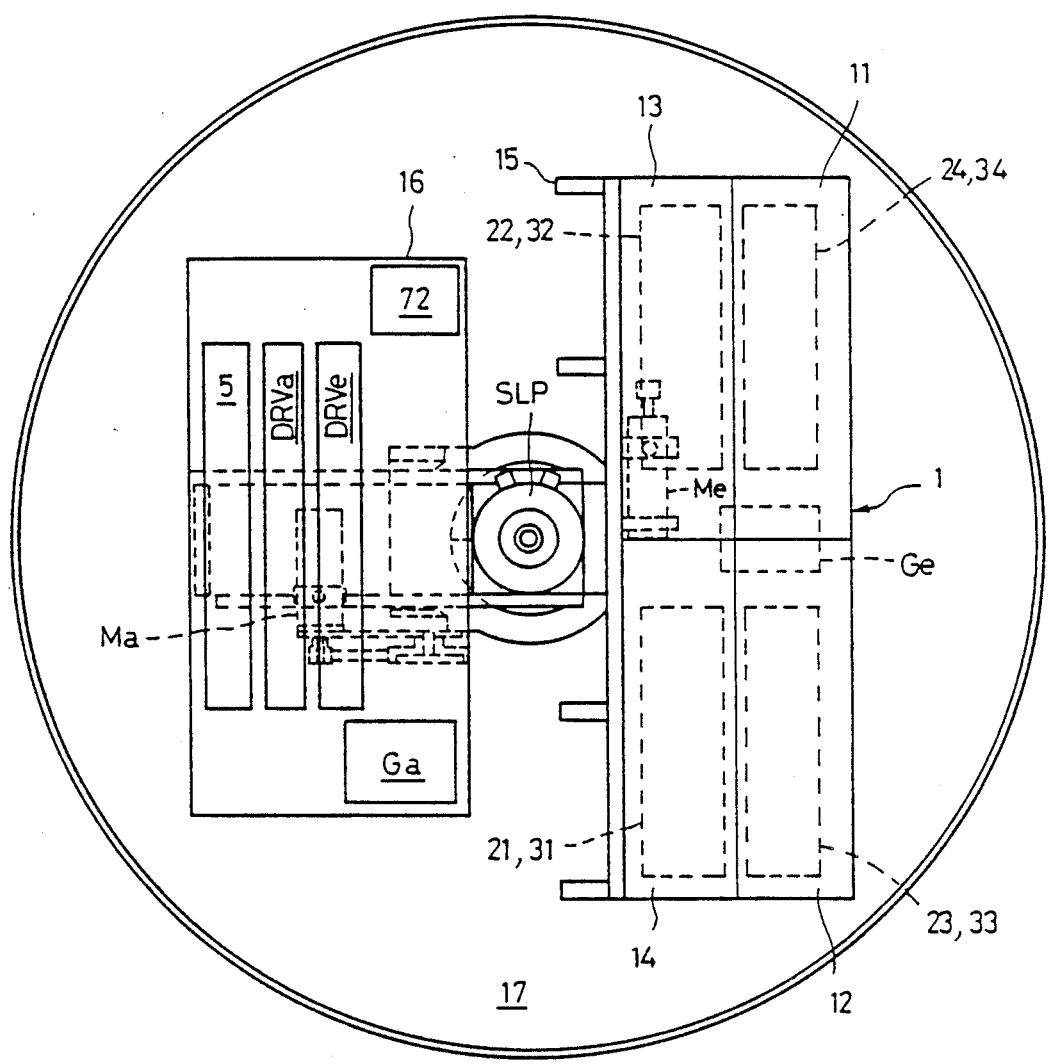
FIG. 2a is a plan view of a mechanism utilized in a first, a second and a third embodiment of the invention, illustrating the appearance thereof.
Figure 2B:
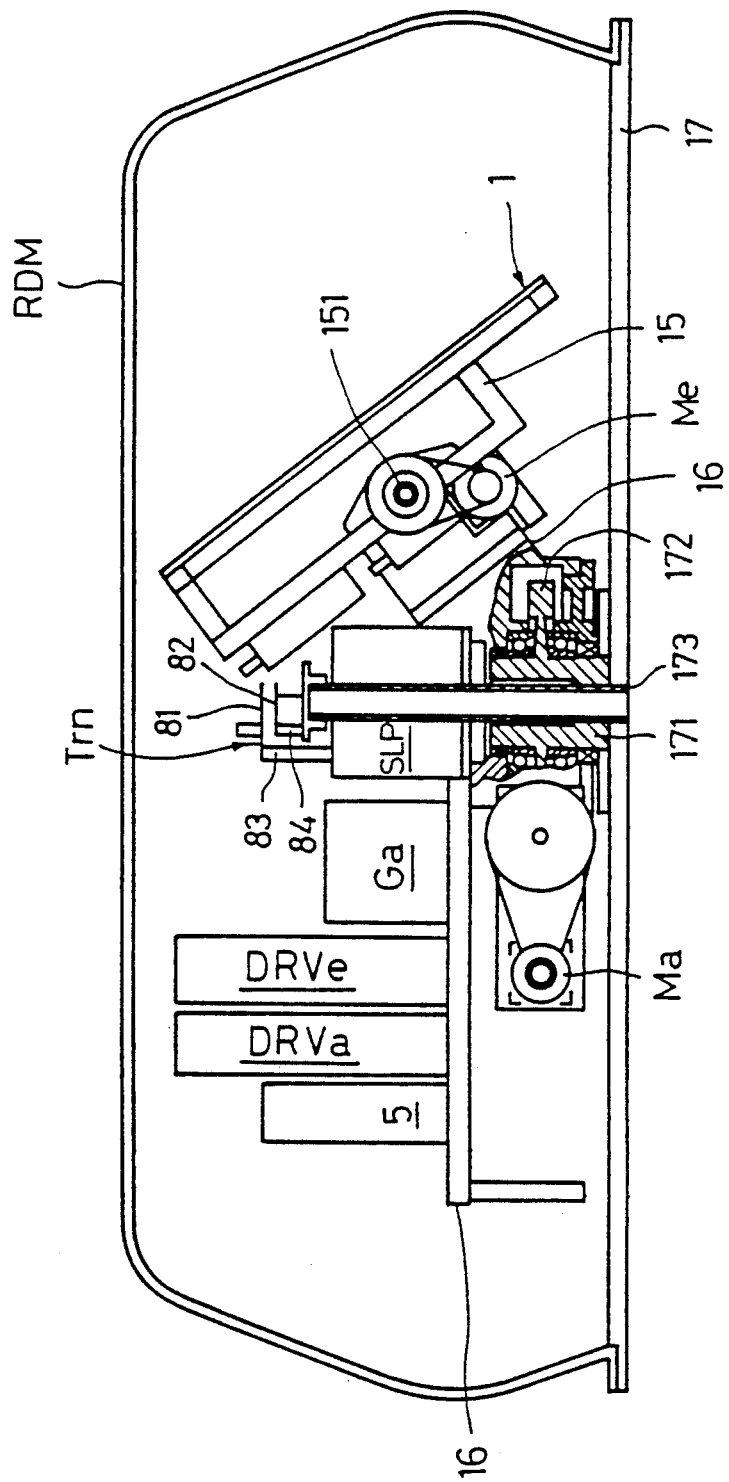
FIG. 2b is a more detailed side elevation, partly broken away, of the mechanism.

All of the four antennas 11 to 14 exhibit an identical response, and their attitudes are integrally altered in either azimuth and/or elevation direction. Reference to FIG. 2a which shows the appearance of the system in top view and also to FIG. 2b which shows the appearance in side elevation is made here briefly.

As shown, each of the antennas 11 to 14 is mounted on an antenna bracket 15 having a plane top surface, in which the respective antennas represent four divided rectangles in appearance. These antennas 11 to 14 will hereafter be inclusively referred to as an antenna unit.

The bracket 15 is rotatably carried by a shaft 151 which is mounted on a rotary mount 16, and may be driven for rotation in either forward or reverse direction about the horizontal shaft 151 by means of an elevation motor Me. When the motor Me is energized for rotation in forward direction, the unit rotates clockwise about the shaft 151, as viewed in FIG. 2b in a direction to increase an elevation angle while when energized for rotation in reverse direction, it rotates counter-clockwise or in a direction to reduce an elevation angle. This direction of rotation will be hereafter referred to as a direction of elevation. The speed of rotation is continuously variable in a range from 0 to 100 deg/s, but the extent of angular movement is limited to 60°, or to a range from 5° to 65° when referenced to a base 17 which is fixedly mounted to the roof of an automobile. A limit switch Lu or Ll (see FIG. 1a) detects that the rotation of the unit reached either limit.

A plurality of angular beargins are used to couple the rotary mount 16 to a vertical shaft 171 in a rotatable manner, which is fixedly mounted on the base 17. The vertical shaft 171 is integrally formed with a sun gear 172, which meshes with a planetary gear (not shown) which is pivotally mounted on the rotary mount 16. The planetary gear is adapted to be driven by an azimuth motor Ma for rotation in either forward or reverse direction. When the motor Ma is energized for rotation in forward direction, the antenna unit 1 rotates clockwise about the vertical shaft 171, as viewed in FIG. 2a, or in a direction corresponding to a right turn of an automobile while when energized for rotation in the reverse direction, the unit rotates counterclockwise or in a direction corresponding to a left turn of the automobile. The direction of such rotation will be hereafter referred to as an azimuth direction. The speed of such rotation is continuously variable in a range from 0 to 100 deg/s, and there is no limit upon the extent of the angular movement.

A bank of BS converters 2, a bank of tuners 3, a signal processing circuit 4 and an elevation gyro Ge are mounted on the underside of the antenna bracket 15 while a control circuit 5, a constant voltage supply 72, an azimuth motor driver DRVa, an elevation motor deriver DRVe and an azimuth gyro Ga are mounted on the rotary mount 16. The shaft 171 is provided with a slip ring unit SLP and a non-contact coupling transformer Trn which allow a connection between these electrical components and the television unit 6. The components mentioned above are covered by a radom RDM. A cooling fan which is driven by a motor M shown in FIG. 1a is mounted on top of the base 17.

Returning to FIG. 1a, feeding points of the plane antennas 11 to 14 are connected to input terminals of BS converters 21, 22, 23 and 24, respectively. Each BS converter is fed with a first local oscillator signal from a first local oscillator LO which is common to all of them, whereby a high frequency signal having a frequency of about 12 GHz which is received by an associated plane antenna is converted to a first intermediate frequency signal having a frequency of about 1.3 GHz.

The output terminals of the BS converters 21, 22, 23 and 24 are connected to input terminals of tuners 31, 32, 33 and 34, respectively, each tuner being fed with a second local oscillator signal from a second local oscillator or a voltage controlled oscillator VCO which is common to all of them. In this manner, the tuners are each operable to convert the first intermediate frequency signal which is output from the associated converters 21 to 24 to a second intermediate frequency signal having a frequency of about 403 MGz. The television set 6 includes a channel selector 64 which provides a control voltage to the oscillator VCO.

Figure 1B:
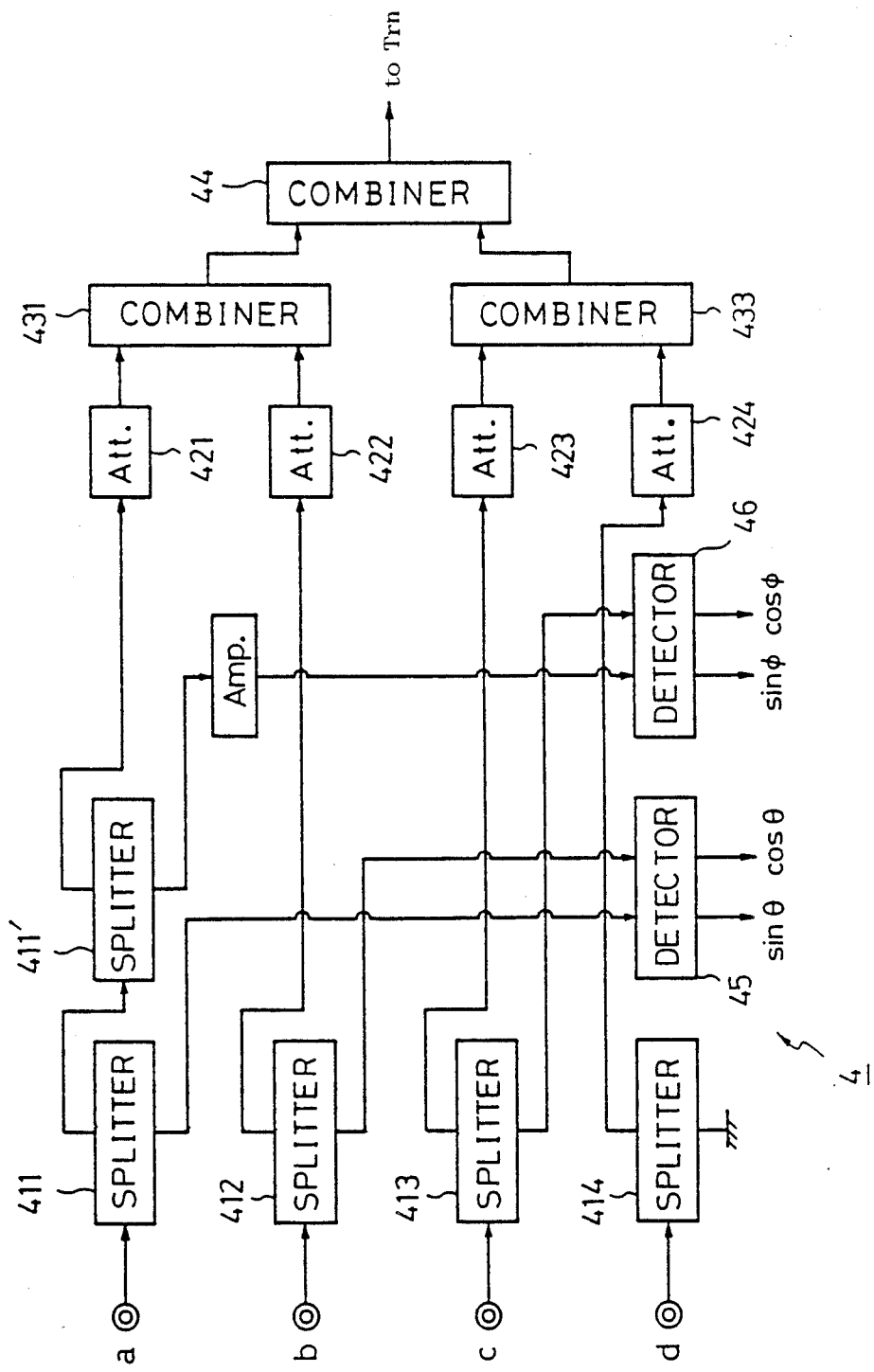

The output terminals of the tuners 31 to 34 are input to four input terminals of the signal processing circuit 4. Referring to FIG. 1b, the circuit 4 comprises five splitters 411, 412, 413, 414 and 411', four attenuators 421, 422, 423 and 424, three combiners 431, 432 and 44, an azimuth phase difference detection circuit 45 and an elevation phase difference detection circuit 46.

All of the splitters 411 to 411' exhibits an identical response, splitting an input signal into two portions. A combination of the splitters 411 and 411'' is effective to split an output signal from the tuner 31 which is input to a terminal a into three portions. The splitter 412 splits an output signal from the tuner 32 which is input to its terminal b into two portions. Similarly, the splitter 413 splits an output signal from the tuner 33 which is input to its terminal b into two portions, and the splitter 414 splits an output signal from the tuner 34 which is input to its terminal d into two portions. However, one of the output terminals of the splitter 414 is connected to a termination.

Each of the attenuators 421 to 424 is effective to adjust a level of split signals while each of the combiners 431, 432 and 44 is effective to synthesize attenuator controlled signals, or output signals from the tuners 31 to 34. A finally synthesized signal is applied to a receiving unit 61 of the television set 6 through the coupling transformer Trn. The receiving unit 61 operates to demodulate the signal to deliver video and voice outputs to CRT display 62 and loudspeakers 63r, 63l.

The azimuth phase difference detection circuit 45 is effective to form an azimuth error signal which reflects an azimuth deflection between the direction represented by the directivity of an antenna and the direction of an oncoming radio wave in the azimuth direction based on the output signals from the tuners 31 and 32. The elevation phase difference detection circuit 46 is effective to form an elevation error signal which represents a declination of the direction indicated by the directivity of an antenna with respect to the direction of an oncoming radio wave in the elevation direction (thus, an elevation declination) based on the output signals from the tuners 31 and 33. The circuits 45 and 46 are shown in detail in FIGS. 1c and 1d. Before these circuits are described in detail, the principle which is utilized in this embodiment to detect the azimuth declination and the elevaton declination will be described first.

It is to be noted that the spacing between the individual plane antennas 11 to 14 which are disposed on the antenna bracket 15 is negligibly small as compared with the distance from the broadcasting satellite to the earth surface, but is not negligible when compared with a wavelength of the radio wave received. In other words, the radio wave received by each of the antennas 11 to 14 will be always equal to each other in signal strength, but is unequal in phase.

Figure 3A:
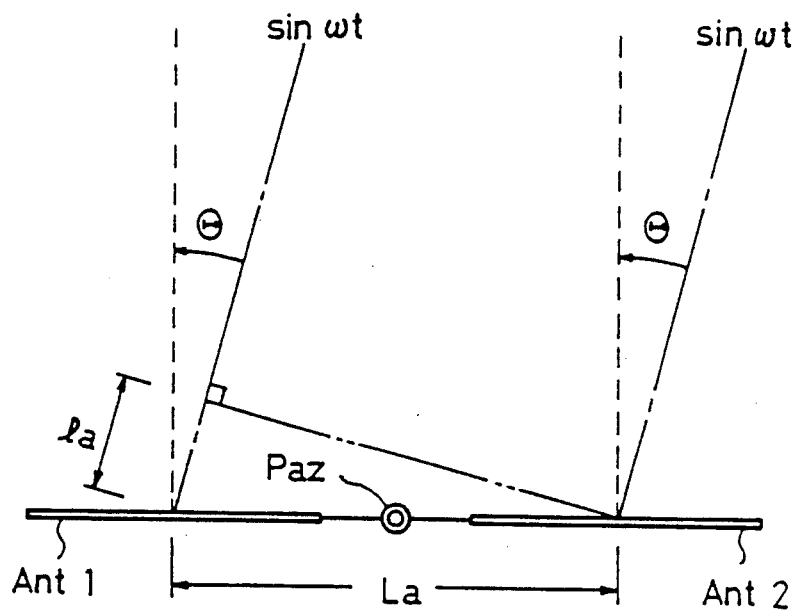
FIGS. 3a and 3b are illustrations of detecting a declination of an antenna in a system of the first embodiment.

Referring to FIG. 3a, it will be noted that a pair of plane antennas which are spaced apart in the azimuth direction, namely, a combination of plane antennas 11 and 12 or a combination of plane antennas 13 and 14 are symbolically indicated by antennas Ant1 and Ant2 which are spaced apart a distance of La on centers about a pivot Paz about which they are rotatable in the azimuth direction. The directivity of each antenna is indicated by broken lines. A single dot phantom line represents a radio wave from the broadcasting satellite. It will be appreciated that the radio wave to each antenna can be regarded substantially as parallel waves since the spacing La is negligibly small as compared with the distance from the broadcasting satellite to the earth surface. A wave front is indicated by a double dot phantom line.

Assume now that an azimuth declination is Θ, taking the counter-clockwise direction as positive when referenced to the direction of the oncoming radio wave. In this instance, the radio wave which reaches the antenna Ant1 must travel through an additional path length of la relative to the radio wave reaching the antenna Ant2, and hence the phase of the signal received by the antenna Ant1 will be lagging with respect to the phase of the signal received by the antenna Ant2. Accordingly, representing the signal received by the antenna Ant1 by sin ωt, the signal received by the antenna Ant2 will be expressed as follows:

$$\sin \omega (t + la/c)$$
$$= \sin (\omega t + 2\pi \cdot La \cdot \sin \Theta / \lambda) \quad (1)$$

where $\omega$ represents the angular velocity of the wave, c the speed of propagation and $\lambda$ the wavelength.

Representing the phase angle $2\pi \cdot La \cdot \sin \Theta/\lambda$ by $\theta$, and by multiplying the signals received by the antennas Ant1 and Ant2 together, we have $$\sin \omega t \cdot \sin (\omega t + \theta)$$
$$= \{\cos \theta - \cos (2\omega t + \theta)\}/2 \qquad (2)$$

The multiplication of the signal received by the antenna Ant1 by the signal received by the antenna Ant2 which is phase shifted by 90° yields:

$$-\sin \omega t \cdot \cos (\omega t + \theta)$$
$$= \{\sin \theta - \sin (2\omega t + \theta)\}/2 \qquad (3)$$

Accordingly, by extracting a d.c. component of the signal which is represented by either the equation (2) or the equation (3), there can be obtained an azimuth error signal $\cos \theta$ and $\sin \theta$ representing a phase difference between the signals received by the antennas Ant1 and Ant2, which allows an azimuth declination $\Theta$ to be determined.

In a similar manner, an elevation declination $\Phi$ can be determined, a clockwise direction being chosen positive as referenced to the direction of an oncoming radio wave.

Figure 3B:
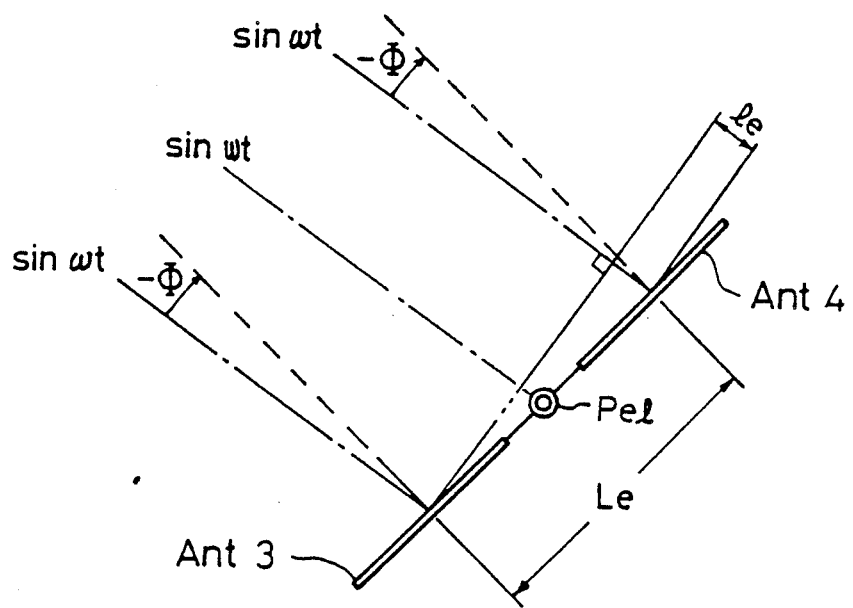

Refer FIG. 3b, it will be seen that a pair of plane antennas which are spaced apart in the elevation direction, namely, a combination of plane antennas 11 and 13 or a combination of plane antennas 12 and 14 are symbolically represented by a pair of antennas Ant3 and Ant4 which are disposed at a spacing Le for rotation about a pivot Pel. Representing a signal received by the antenna Ant3 by $\sin \omega t$, a phase advance of a signal received by the antenna Ant4 relative thereto or a phase angle $\phi$ therebetween will be equal to $2\pi \cdot Le \cdot \sin \Phi/\lambda$. Thus, as before, the signal received by the antenna Ant 3 may be multiplied by the signal received by the antenna Ant4 directly or by the same signal which is phase shifted by 90°, yielding $$\sin \omega t \cdot \cos (\omega t + \phi)$$
$$= \{\sin \phi - \sin (2\omega t + \phi)\}/2 \qquad (4)$$

or $$-\sin \omega t \cdot \cos (\omega t + \phi)$$
$$= \{\sin \phi - \sin (2\omega t + \phi)\}/2 \qquad (5)$$

By extracting a d.c. component of each of these signals, there can be obtained elevation error signals $\cos \phi$ and $\sin \phi$ representing a phase difference between the signals received by the antennas Ant3 and Ant4.

It is to be understood that a geometrically continuous function of phase differences $\theta$ and $\phi$ between the antennas in the form of $2\pi \cdot La \cdot \sin \Theta/\lambda$ and $2\pi \cdot Le \cdot \sin \Phi/\lambda$ can be detected over a range of angles of the antenna which corresponds to the main lobe representing the directivity of the antennas used.

Figure 1C:
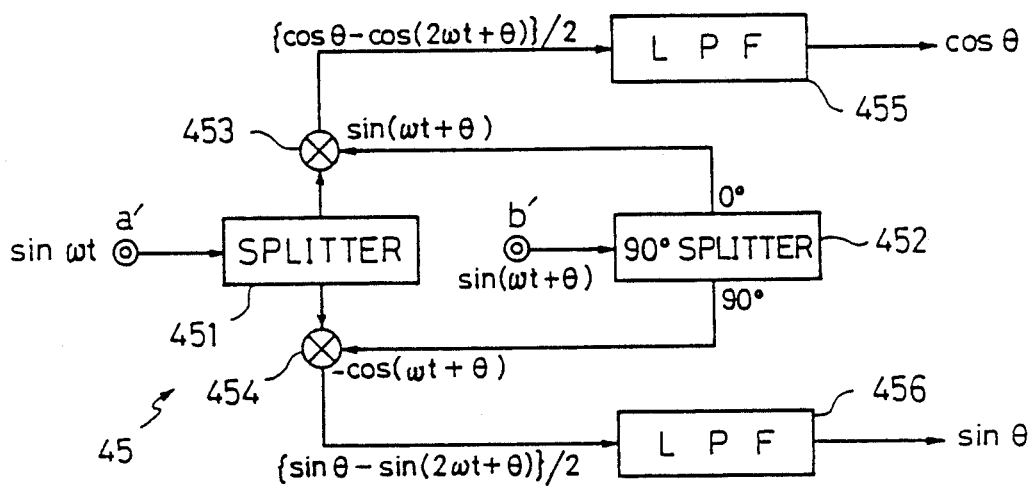
FIGS. 1c and 1d are block diagrams of an azimuth phase difference detection circuit 45 and an elevation phase difference detection circuit 46, both shown in FIG. 1b.
Figure 1D:
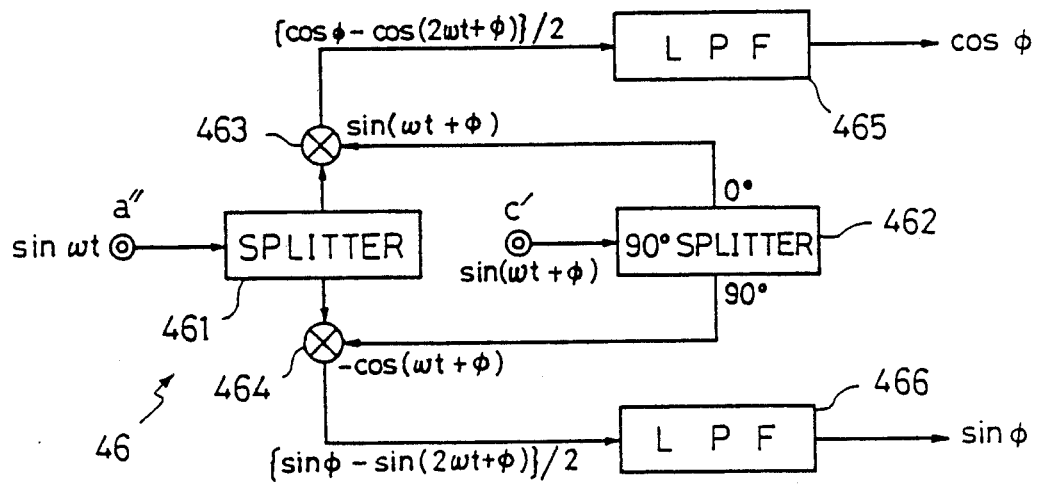

Since the azimuth error signal and the elevation error signal can be obtained in the same say as mentioned above, the azimuth phase difference detection circuit 45 and the elevation phase difference detection circuit 46 are similarly constructed as shown in FIGS. 1c and 1d.

Briefly describing the operation of these circuits, in the azimith phase difference detection circuit 45 (FIG. 1c), a signal received by the plane antenna 11 which is input to its terminal a' and which represent an output from the tuner 31 is split by a splitter 451 into two portions while a signal received by the plane antenna 12 which is input to its terminal b' and which represent an output from the tuner 32 is split by 90° splitter 452, one of the outputs of which is fed to a mixer 453 while the other output is phase shifted by 90° before it is fed to a mixer 454. Low pass filters 455 and 456 are effective to eliminate a.c. components, thus deriving the azimuth error signals $\cos \theta$ and $\sin \theta$ representing a cosine or a sine function thereof (which will be hereafter referred to as "a cosine representation" and "a sine representation", respectively).

In the elevation phase difference detection circuit 45 (FIG. 1d), a signal received by the plane antenna 11 which is input to its terminal a" and which represent an output from the tuner 31 is split by a splitter 461 into two portions while a signal received by the plane antenna 13 which is input to its terminal c' and which represent an output from the tuner 33 is split by 90° splitter 462, one of the outputs of which is directly fed to a mixer 463 while the other output is phase shifted by 90° before it is fed to a mixer 464 for multiplication therein. Subsequently, low pass filters 465 and 466 are effective to eliminate a.c. components, thus extracting the elevation error signals in the cosine and sine representations, $\cos \Phi$ and $\sin \Phi$. The azimuth error signals in the cosine and sine representations $\cos \theta$ and $\sin \theta$ and the elevation error signals in the cosine and sine representations $\cos \phi$ and $\sin \phi$ are supplied to the control circuit 5.

In the description given above, the oncoming radio wave has been represented in a simplified form of $\sin \omega t$, but in actuality, disturbances are superimposed upon the reception level other than $\omega t$. Assuming no disturbance, the azimuth declination $\Theta$ can be determined by detecting either one of the cosine and sine representations of the azimuth error signals $\cos \theta$ and $\sin \theta$, and an elevation declination $\Phi$ can be determined by detecting either one of cosine and sine representations of elevation error signals $\cos \phi$ and $\sin \phi$. However, even though an influence of any change in the distance from the broadcasting satellite to the receiving point upon the reception level can be neglected, a change in the reception signal level as caused by a reduction in the antenna gain due to a deviation of the directivity of the antenna with respect to the direction of the oncoming radio wave or caused by disturbances which arises as a result of varying reception environment cannot be neglected, and such change will be reflected into the azimuth and the elevation error signals. It will be noted however that a change in the reception signal level as caused by the disturbances will be equally reflected in the cosine and sine representations of azimuth error signals, $\cos \theta$ and $\sin \theta$, as well as in the cosine and sine representations of elevation error signals, $\cos \phi$ and $\sin \phi$. Accordingly, in the present embodiment, a ratio of the cosine representation of azimuth error signal $\cos \phi$ to the sine representation of azimuth error signal $\sin \theta$ or $\tan \theta$ as well as a ratio of the cosine representation of elevation error signal $\cos \phi$ to the sine representation of elevation error signal $\sin \phi$ or $\tan \phi$ are obtained to derive an error signal which is substantially free from the influence of the disturbances. tan θ and tan θ will hereafter be referred to as absolute errors.

Figure 4C:
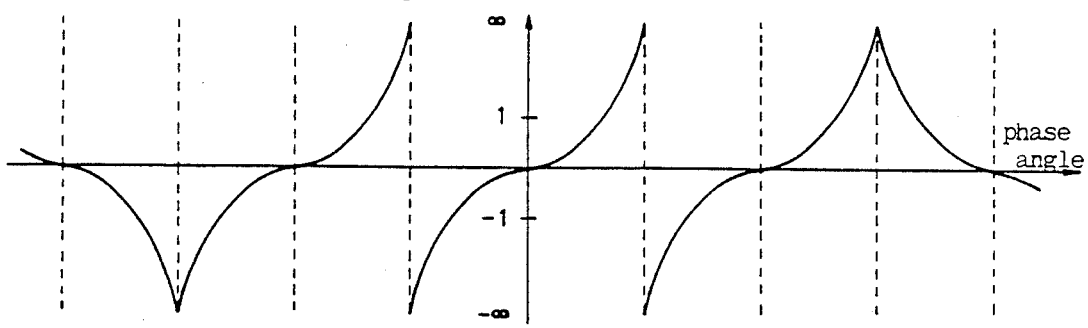
FIG. 4c graphically shows a ratio between the error signals.

FIG. 4a graphically shows the cosine and sine representations of azimuth error signals, cos θ and sin θ, as taken on the ordinate plotted and against the azimuth phase angle θ on the abscissa. FIG. 4b graphically shows a relationship between the level of an error signal and the phase angle θ by calculating the signal level as a mean square of the both error signals (directivity response in the azimuth direction). It will be seen from these graphical illustrations that the level or amplitude of the error signal varies greatly with the phase angle θ. However, it will be noted that such variation has an equal influence upon the azimuth error signals cos θ and sin θ which include the phase angle θ as a parameter, so that their ratios tan θ has a constant amplitude component of "1", thus yielding an invariant tangent curve illustrated in FIG. 4c.

Figure 5A:
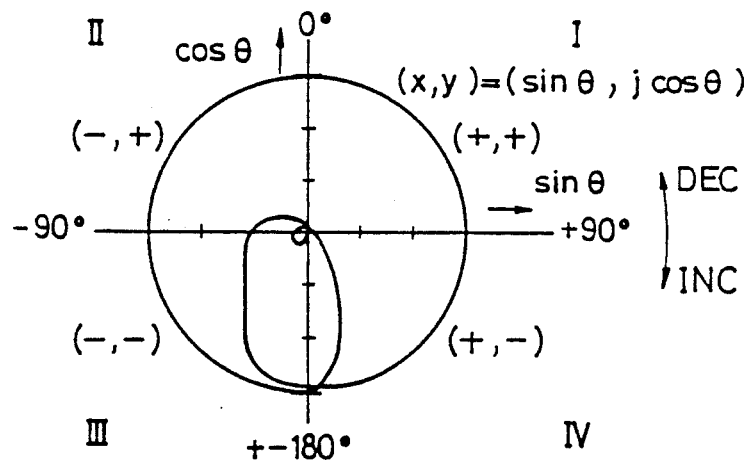
FIG. 5a is a diagram showing a correlation between the positive and the negative polarity of a detection signal sin $\theta$ and cos $\theta$ from the detection circuit 45 shown in FIG. 1c and the quadrant of the phase difference $\theta$.

In other words, the azimuth phase angle θ can be accurately indicated by the absolute azimuth error tan θ. However, it is to be noted that the phase angle θ represents a phase difference between the signals received by the plane antennas 11 and 12 or ($2\pi \cdot La \cdot \sin \Theta / \lambda$) as mentioned previously, and is related to an actual azimuth declination Θ in a manner indicated on a declination axis shown bottom-most on FIG. 4b. For a more detailed description, reference is made to FIG. 5a which shows a Lissajous' figure of an azimuth error signal where coordinates represent $(x, y) = (\sin \theta, j \cos \theta)$. As shown, unless a reference on a base point for the phase is fixed, it is impossible to determine a particular phase angle θ from a pair of azimuth error signals cos θ and sin θ.

Figure 4D:
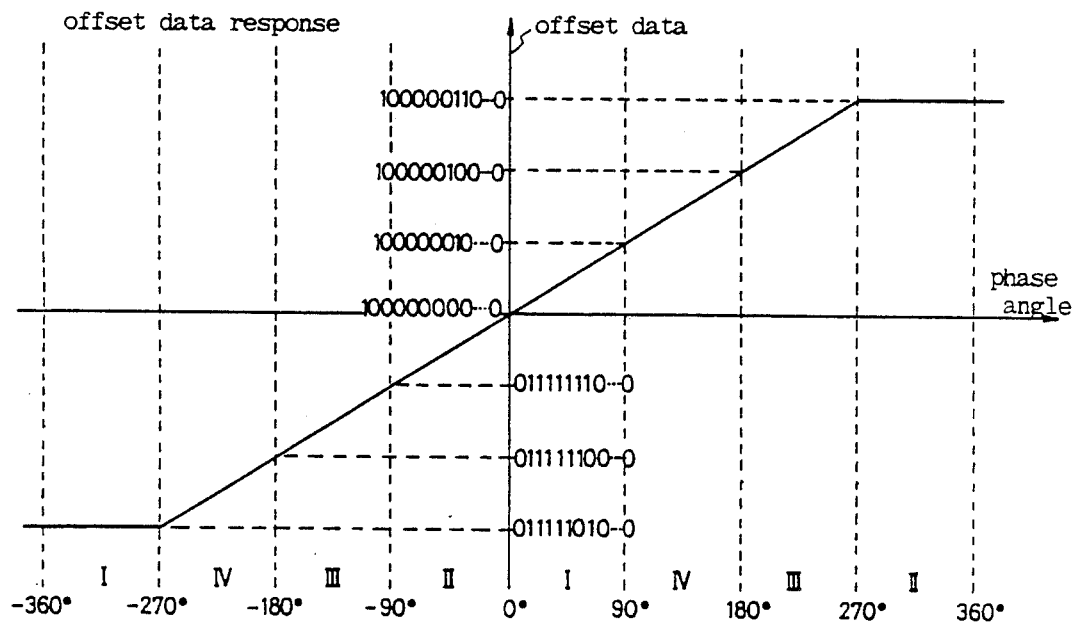
FIG. 4d graphically shows a correlation between a phase difference as calculated by a control circuit 5 from detection signals derived by the circuits 45 and 46 shown in FIGS. 1c and 1d and offset data which represents such phase difference.
Figure 5B:
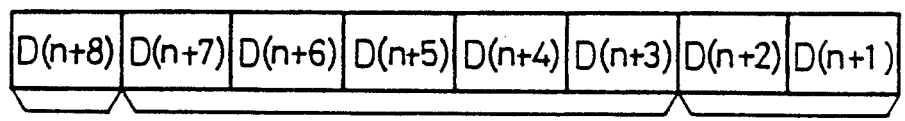
FIG. 5b is a schematic view illustrating the content of offset data shown in FIG. 4d.
Figure 5B:

In the present embodiment, a reference for the phase angle is established at a point where a mean square of the pair of azimuth error signals cos θ and sin θ is at its maximum, and a declination from the reference point is chosen as representing the phase angle θ. Referring to FIG. 4d, one quadrant is divided into $2^n$ segments to provide 16 bit numerical data or offset data, choosing $(1000\ldots0)_2$ as representing a phase angle of 0° where the suffix "2" indicates a binary notation, and a rotation in the clockwise direction is taken as positive. FIG. 5b shows the arrangement of offset data as comprising the least significant bit to n-th bits representing a phase angle within a quadrant (angle data), (n+1)-th and (n+2)-th bits representing a particular quadrant (quadrant data), (n+3)-th and (n+4)-th bits representing a number of phase revolutions (revolution data) and n+8)-th as representing the direction of a phase rotation (polarity data).

The signal processing circuit 4 supplies the cosine and sine representations of azimuth error signal, cos θ and sin θ, as well as the cosine and sine representations of elevation error signal, cos φ and sin φ, to the control circuit 5, which then determine azimuth offset data (Da) and elevation offset data (De), each comprising (n+8) bits. The former is delivered to the azimuth motor driver DRVa while the latter is delivered to the elevation motor driver DRVe. Each of the motor drivers is effective to energize either the azimuth motor Ma or the elevation motor Me for rotation in forward or reverse direction at a rate which is proportional to a deviation represented by respective offset data as referenced to the reference point of $(1000\ldots0)_2$ (the origin of coordinates shown in FIG. 4d).

It will be appreciated from the foregoing description that such offset data cannot be obtained based on the described error signals when an automobile passes through a tunnel or the like where the antenna unit 1 becomes shielded to prevent sufficient signals from being derived. In the control circuit 5 of the present embodiment, declination signals detected by the azimuth gyro Ga mounted on the rotary mount 16 and by the elevation gyro Ge mounted on the backside of the antenna bracket 15 (the current angular deviation with respect to the angular position which they assume when reset) are utilized to provide a correction for the attitude of the unit 1 in a manner dependent upon the attitude of the automobile itself as well as a change in its travelling direction, so that the resumption of the tracking operation may be expedited upon recovery of the receiving condition.

The control circuit 5 comprises a computer system which essentially comprises CPU. The operation of the control circuit 5 will now be described with reference to flow charts shown in FIGS. 6a to 6e. When a power switch 65 of the television set 6 is turned on, a voltage booster 71 supplies 100 V, A.C. to a constant voltage supply 72 through a slip ring unit, whereupon the supply 72 is effective to feed required voltages to various parts of the system. This boots up the system, and the control circuit 5 initializes various parts of the system (step 1). Then follows a standby step (step 2) which is required to allow a time for the warm-up of various portions. The control circuit 5 then supplies suitable elevation offset data De to the elevation motor driver DRVe, thus commanding the elevation motor Me to be energized for rotation in reverse direction until the limit switch Ll (LL sensor) detects that the lower limit is reached during the rotation in the elevation direction (steps 3 and 4). When this operation is completed, a timer T is started (step 5), beginning a search to determine the direction of an oncoming radio wave.

The search takes place by calculating a mean square of azimuth error signals cos θ and sin θ (representing amplitude data) corresponding to the reception signal level. Specifically, the cosine and sine representations of azimuth error signal, cos θ and sin θ, as supplied from the signal processing circuit 4 are read (step 6), its mean square (azimuth amplitude data Ran) is determined (step 7), and such value is compared against a threshold THas (step 8; also see FIG. 4b). If the azimuth amplitude data Ran is equal to or less than the threshold THas, appropriate azimuth offset data Da is applied to the azimuth motor driver DRVa to command the azimuth motor Ma to be energized for rotation in forward direction (step 10), thus updating the angle in the azimuth direction in which the directivity of the antenna unit 1 is oriented (step 11; thus waiting for the completion of the update operation).

In this manner, the comparison of the azimuth amplitude data Ran against the threshold THas is repeated while sequentially updating the angle corresponding to the directivity in the azimuth direction. The antenna unit 1 completely sweep through the azimuth direction in a time interval of about Tr. Thus, when the content of the timer T exceeds the time interval Tr (step 9), unless the limit switch Lu (LL sensor) detects that the upper limit of rotation in the elevation direction is reached (step 12), appropriate elevation offset data De is applied to the elevation motor driver DRVe, thus commanding the elevation motor Me to be energized for rotation in forward direction (step 13), thus updating the directivity of the antenna unit in the elevation plane (step 14; waiting for the completion of the update operation), whereupon the program returns to step 5 and repeats the subsequent steps. In this manner, a helical scanning is performed during the search of the direction of the oncoming radio wave by helically updating the angle of directivity.

Unless the azimuth amplitude data Ran exceeds the threshold THas before the upper limit of rotation in the elevation direction is detected by the limit switch Lu (LL sensor), the program stays at standby (step 15) for a given time interval, and then begins the helical scanning again. However, if the threshold THas is exceeded, the helical scanning is interrupted (step 8) and the detection of a peak value is begun.

Figure 6B:
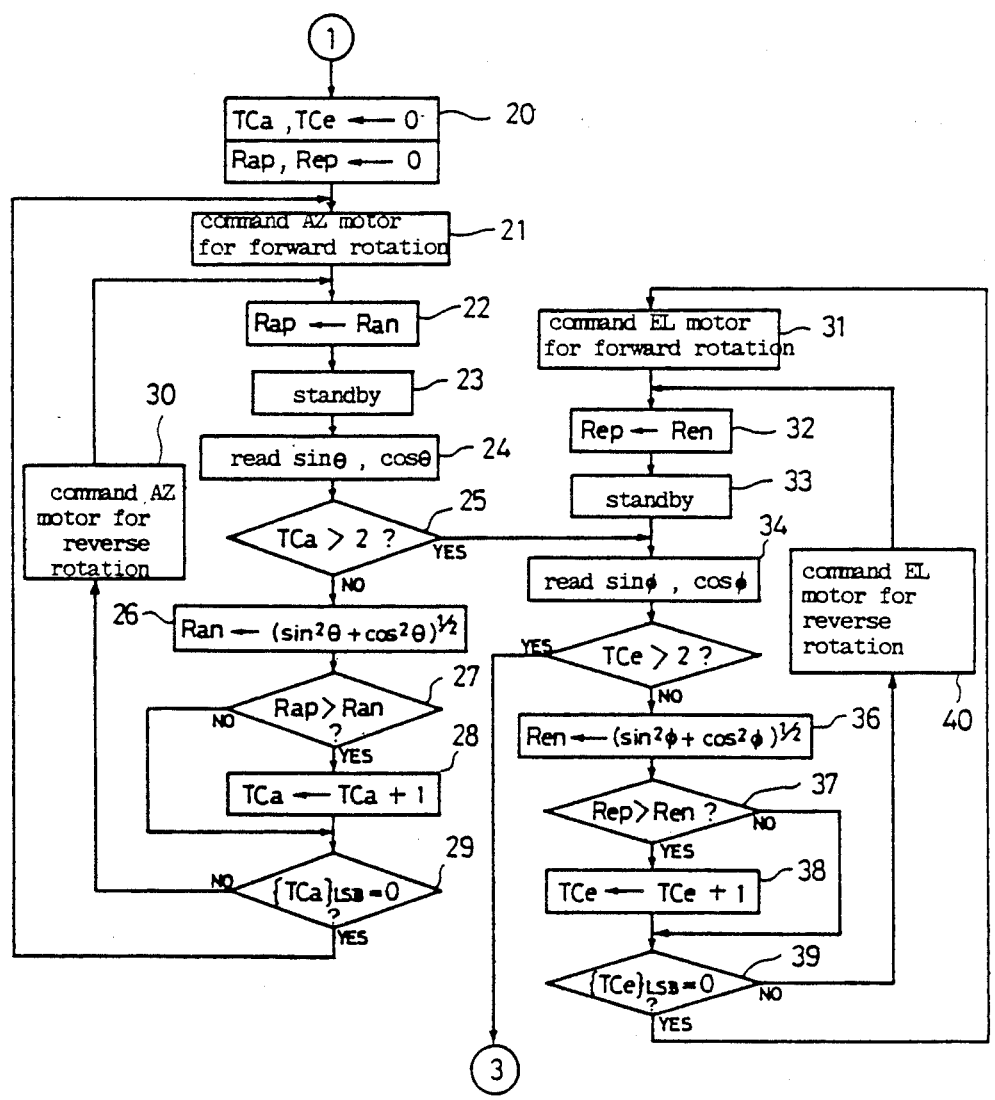
Figure 6C:
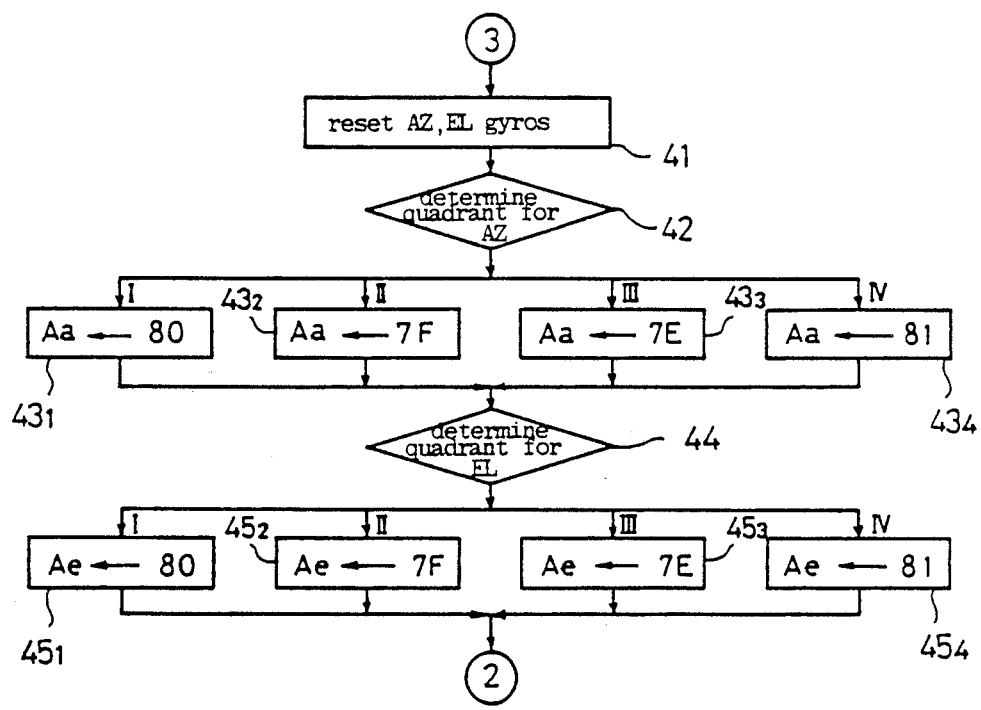
Figure 6D:
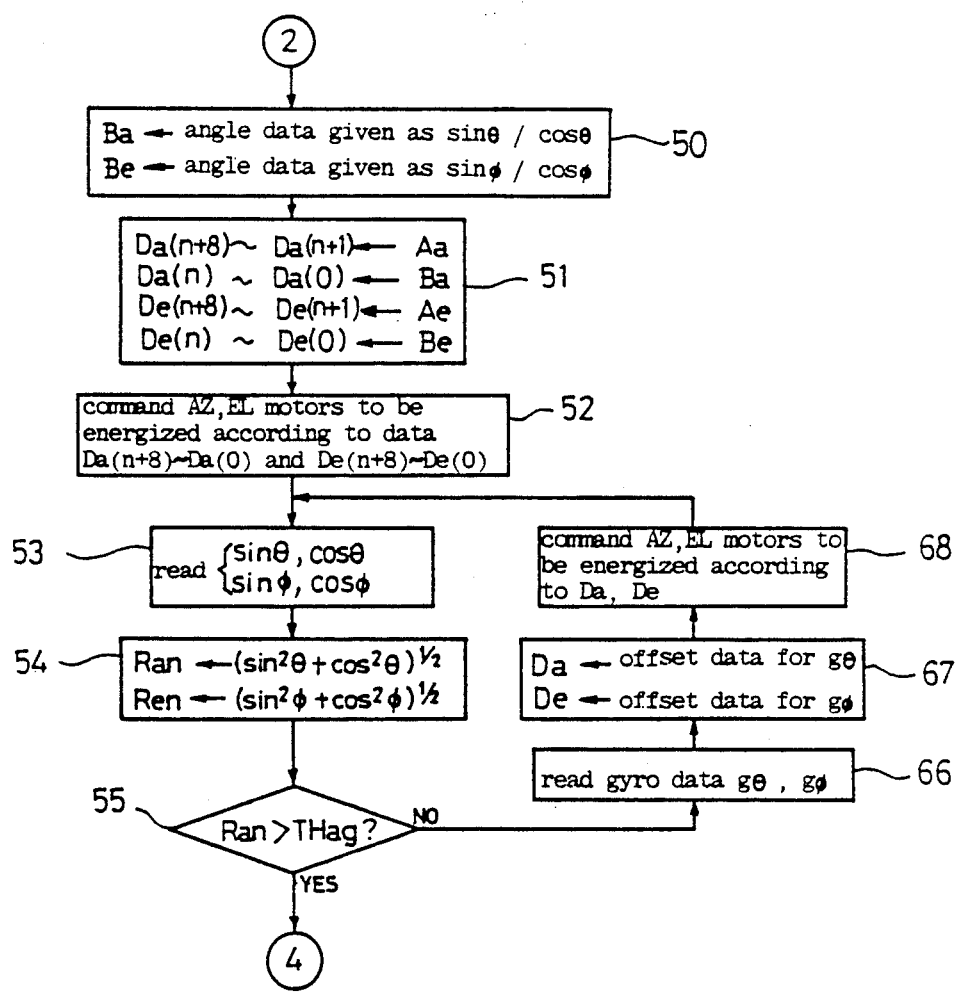
Figure 6E:
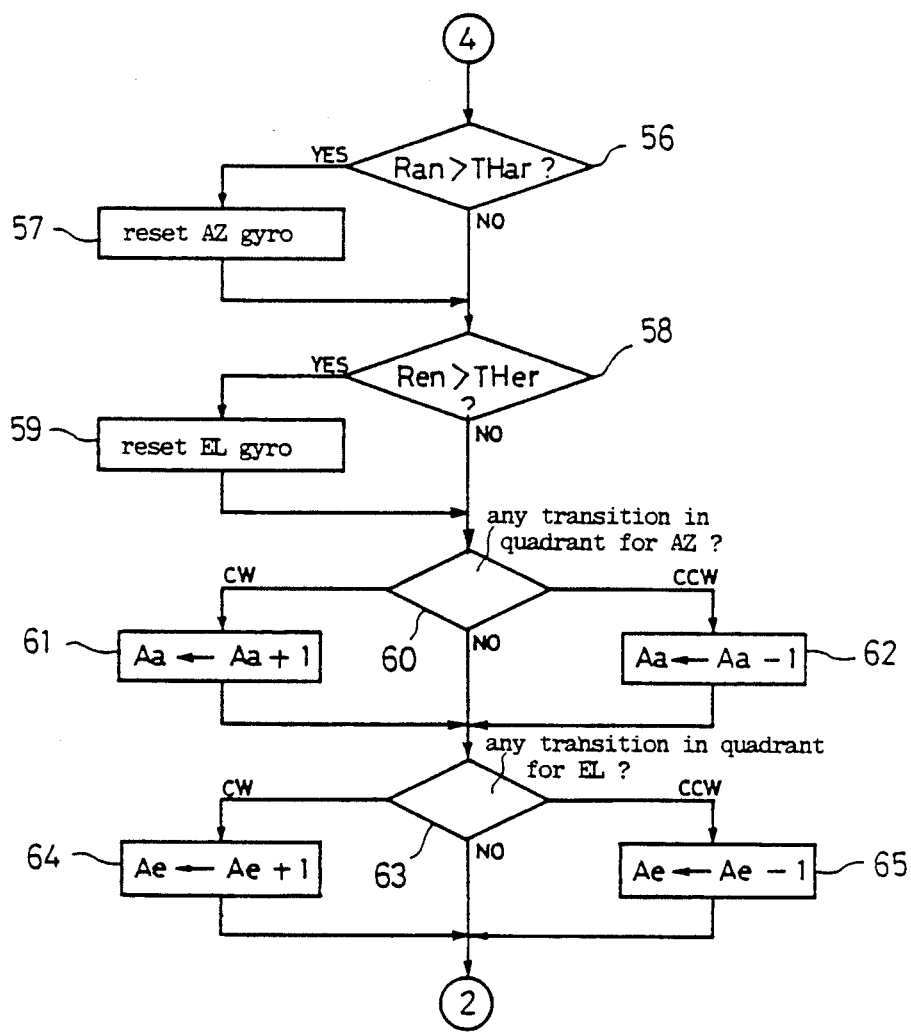

The detection of the peak value is also made on the basis of amplitude data, but provides a finer control as compared with the search. Referring to FIG. 6b, an azimuth toggle counter TCa and an elevation toggle counter TCe are initially cleared and an azimuth past amplitude data Rap and an elevation past amplitude data Rep are cleared (step 20). Appropriate azimuth offset data Da is applied to the azimuth motor driver DRVa to energize the azimuth motor Ma for rotation in forward direction (step 21) while the old azimuth amplitude data Ran is saved as azimuth past amplitude data Rap (step 22).

In this manner, the angle for the directivity is incrementally updated in the azimuth direction, which is indicated by a standby (step 23), followed by reading azimuth error signals $\cos \theta$ and $\sin \theta$ which prevail after the updating operation (step 24). The resulting azimuth amplitude data Ran is obtained (step 26) and compared against the azimuth past amplitude data Rap which prevailed before the update operation (step 27).

If the directivity of the antenna 1 has been brought closer to the direction of the oncoming radio wave, the azimuth amplitude data Ran increases above the azimuth past amplitude data Rap. Conversely, if the directivity moves away from the direction of the oncoming wave, the azimuth amplitude data Ran will reduce below the azimuth past amplitude data Rap (see FIG. 4b). In the former instance, the incremental updating of the directivity in the direction in which it has been updated may be continued and an increase or decrease in the azimuth amplitude data may be checked. In the latter instance, however, the direction in which the updating takes place must be reversed. The least significant bit (LSB) of a count in the toggle counter TCa is used to determine the direction in which the updating operation is to take place. Specifically, if the azimuth past amplitude data Rap increases above the azimuth amplitude data Ran, the toggle counter TCa is incremented by 1 (step 28), and if LSB of the toggle counter TCa is equal to "0", an incremental updating takes place in the positive direction while the updating takes place in the opposite direction when LSB is equal to "1" (steps 29, 30 or 29, 21).

In this manner, the toggle counter TCa is incremented by 1 each time the azimuth past amplitude data Rap increases above the azimuth amplitude data Ran, so that if a count in the toggle counter TCa is equal to or greater than 3, it follows that the scanning has passed through the direction of the oncoming radio wave in the azimuth direction at least twice. In other words, as far as the azimuth direction is concerned, the directivity of the antenna 1 is substantially aligned with the direction of the oncoming radio wave. This completes the detection of a peak value in the azimuth direction. The detection of a peak value in the elevation direction takes place in a similar manner. Since the operation takes place in a similar manner as in the detection of a peak value in the azimuth direction, a corresponding description will not be specifically described.

When the detection of a peak value in both the azimuth and the elevation direction is completed, the directivity of the antenna 1 is substantially aligned with the direction of the oncoming radio wave. Accordingly, the azimuth gyro Ga and the elevation gyro Ge are reset (step 41), and the quadrant in which the azimuth phase angle and the elevation phase angle are located are determined (steps 42 to 45). During this decision, $(10000000)_2$ representing the first quadrant, $(01111111)_2$ representing the second quadrant, $(01111110)_2$ representing the third quadrant, or $(10000001)_2$ representing the fourth quadrant, is stored in Aa register if the signs of the azimuth error signals $\cos \theta$ and $\sin \theta$ are $(+,+)$, $(-,+)$, $(-,-)$ or $(+,-)$, respectively. $(10000000)_2$ representing the first quadrant, $(01111111)_2$ representing the second quadrant, $(01111110)_2$ representing the third quadrant, or $(10000001)_2$ representing the fourth quadrant, is stored in Ae register if the signs of the elevation error signals $\cos \phi$ and $\sin \phi$ are $(+,+)$, $(-,+)$, $(-,-)$ or $(+,-)$, respectively.

Angle data (a value obtained by dividing 90° into $2^n$ segments) representing a phase angle corresponding to the ratio of the cosine representation of azimuth error signal $\cos \theta$ to the sine representation of azimuth error signal $\sin \theta$ or the absolute azimuth error $\tan \theta$ as well as angle data representing a phase angle corresponding to the ratio of the cosine representation of elevation error signal $\cos \phi$ to the sine representation of elevation error signal $\sin \phi$ or the absolute elevation error $\tan \phi$ are read from ROM table (step 50), and are stored in Ba and Be registers (step 51).

The content in the Aa register is stored into the most significant bit (MSB) to $(n+1)$-bit (Da $(n+8)$ to Da $(n+1)$) of the azimuth offset data Da; the content in the Ba register is stored into n-th bit to LSB (Da (n) to Da (0)) of the Ba register; the content of the Ae register is stored into MSB to $(n+1)$-th bit (De $(n+8)$ to De $(n+1)$) of the elevation offset data De; and the content of the Be register is stored into n-th bit to LSB (De (n) to De (0)), respectively (step 51). Azimuth offset data Da is applied to the azimuth motor driver DRVa to command the energization of the azimuth motor Ma, and elevation offset data De is applied to the elevation motor driver DRVe to command the energization of the elevation motor Me (step 52).

As the antenna unit is driven in response thereto, azimuth error signals $\cos \theta$ and $\sin \theta$ and elevation error signals $\cos \phi$ and $\sin \phi$ which are produced after a change in the attitude are read (step 53), and the resulting azimuth amplitude data Ran and the elevation amplitude data Ren are determined (step 54). If the azimuth amplitude data Ran exceeds the threshold THag, it is determined that the error signals which have just been read are reliable (step 55), and if the azimuth amplitude data Ran exceeds the threshold THar (THar>THag), it is determined that the directivity in the azimuthal plane of rotation is aligned with the direction of the oncoming radio wave with a high probability, and accordingly, the azimuth gyro Ga is reset (steps 56, 57). If the elevation amplitude data Ren exceeds the threshold THer, it is determined that the probability that the directivity in the elevational plane of rotation is aligned with the direction of the oncoming radio wave is high, thus resetting the elevation gyro Ge (steps 58, 59).

The quadrant in which the azimuth phase angle subsequent to a change in the attitude is located is determined from the signs of the azimuth error signals cos θ and sin θ which are read at step 53 in a similar manner as before, and the quadrant thus determined is compared against the quadrant in which the azimuth phase angle is located before the corresponding change in the attitude which is stored in (n+1)- and (n+2)-th bits (Da (n+1), Da (n+2)) of the azimuth offset data Da to see the existence of any transition in the quadrant in which the azimuth phase angle is located (step 60). If a transition of the quadrant is found to have occurred in the clockwise direction, the content of the Aa register which store the eight most significant bits of the azimuth offset data Da is incremented by 1 (step 61). Conversely, if the transition of the quadrant takes place in the counter-clockwise direction, such content is decremented by 1 (step 62).

In the similar manner, a transition in the quadrant in which the elevation phase angle is located is determined (step 64), and the content of the Ae register which stores the eight most significant bits of the elevation offset data De is updated, whereupon the program returns to step 50 and repeats the described operation.

As mentioned above, in the present embodiment, the azimuth gyro Ga is reset when a high probability is found that the directivity in the azimuth direction coincides with the direction of the oncoming radio wave, and the elevation gyro Ge is reset when a high probability is found that the directivity in the elevation direction coincides with the direction of the oncoming radio wave (steps 56 to 59). Accordingly, azimuth gyro data gθ which is output from the azimuth gyro Ga indicates a declination of the directivity of the antenna unit 1 in the azimuth direction (this declination should be distinguished from the azimuth declination used before in respect of the reference chosen; the same applies to the elevation) as referenced to the latest directivity for which a high probability is found for the coincidence of the directivity of the antenna unit with respect to the direction of the oncoming radio wave in the azimuth direction. Similarly, elevation gyro data gφ which is output from the elevation gyro Ge indicates a declination of the directivity of the antenna unit in the elevation direction as referenced to the latest directivity which is found to provide a high probability for the coincidence of the directivity of the antenna unit 1 with respect to the direction of the oncoming radio wave in the elevation direction. Accordingly, when valid signals cannot be received as when the antenna unit 1 is shielded from the radio wave when an automobile is passing through a tunnel or running in the shade of a building (or at step 55 if the azimuth amplitude data Ran reduces below the threshold THag), the azimuth gyro data gθ and the elevation gyro date gφ are read (step 66), and azimuth offset data Da and elevation offset data De are determined on the basis of these data (step 67) to be applied to the azimuth motor driver DRVa or the elevation motor driver DRVe for commanding the energization of the azimuth motor Ma or the elevation motor Me (step 68).

When a good receiving environment is resumed and the antenna unit 1 supplies a valid signal (step 55 when the azimuth amplitude data Ran exceeds the threshold THag), a modification in controlling the antenna directivity in accordance with the gyro signals is terminated, resuming the tracking control which is based on the individual error signals.

Returning to FIG. 1a, it is to be noted that in order to minimize the non-fed transmission zone during which extraneous noises picked up may be mixed into the initial stage of a h.f. amplifier, a common signal processing circuit 2, a received signal processing circuit 3 and the error signal processing circuit 4 are mounted on the backside of the antenna bracket 15.

In addition, the azimuth gyro Ga is mounted on the rotary mount 16 in order to detect any rotation of the antenna unit 1 in the azimuth direction as caused by an external force, and the elevation gyro Ge is mounted on the backside of the antenna bracket 15 in order to detect any rotation of the antenna unit 1 in the elevation direction as may be caused by an external force.

These elements rotate together with the rotary mount 16 (inclusive of those elements associated with the antenna bracket 15; hereafter such motional system will be referred to as a rotational system). There is no limitation upon the extent of rotation. This would be very advantageous in providing a wiring connection if a rotational system is closed within an electrical system. In this sense, the control system 5, the motor drivers DRVa and DRVe are mounted on the rotary mount 16 (see FIG. 2).

While the control system can be closed within the rotational system, the reception system and the power feed system cannot be closed within the rotational system in view of the need to provide the television set within an automobile and of the physical requirement that a power supply be provided externally. For this reason, the rotational coupling transformer Trn is provided to meet the former requirement while the slipping unit SLP is provided to satisfy the latter requirement, thus supplying a connection with the external rotational system.

Figure 8A:
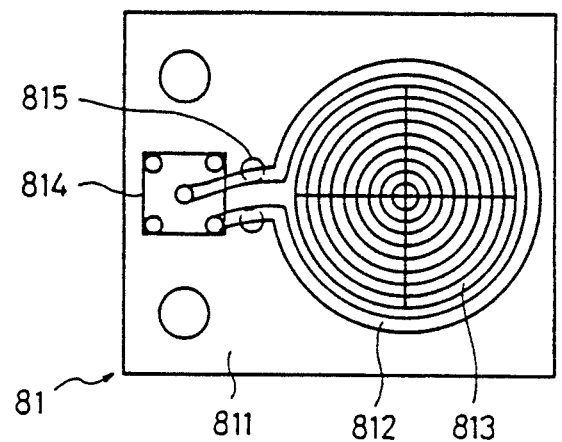
FIG. 8a is an enlarged top view of a coil plate 81 shown in FIG. 2b.
Figure 8B:
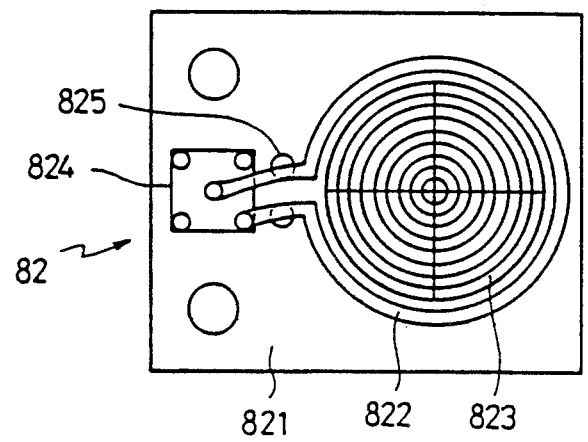
FIG. 8b is an enlarged top view of a coil plate 82 shown in FIG. 2b.

Referring to FIGS. 8a and 8b, the rotational coupling transformer Trn includes coil plates 81 and 82. As shown in FIGS. 8a and 8b, these coil plates are constructed in an identical manner. Each of them includes a rectangular baseplate 811 (or 821), a one-turn circular coil 812 (or 822), a positioning mark 813 (or 823), a 50Ω coaxial connector 814 (or 824) and an attenuator 815 (or 825).

The baseplate 811 (or 821) comprises a translucent epoxy glass plate, and the circular coil 812 (or 822) is formed on its surface by etching a copper foil. The positioning mark 813 (or 823) is printed inside the circular coil 812 (or 822) in the form of a plurality of concentric circles and a pair of perpendicular rectilinear lines passing through the center thereof.

The coaxial connector 814 (or 824) is threadably engaged with the back surface of the baseplate 811 (or 821), and includes an inner conductor which is connected to one end of the circular coil 812 (or 822) while the outer conductor is connected to the other end of the coil. These connectors are connected to a coaxial cable (not shown) which is connected to the received signal processing circuit 3 or to a coaxial cable (not shown) which is connected to the television set 6. The attenuator 815 (or 825) comprises a resistor which provides a broad band response and which is connected across the opposite terminals of the circular coil 812 (or 822).

The coil plates 81 and 82 thus constructed are disposed so as to face each other in a manner such that the centers of the respective coils are aligned with the center of rotation in the azimuth direction, and thus is supported in a plane parallel to the plane of the azimuth rotation. To effect such support, use is made of a stay 83 which is mounted on the rotary mount 16 and of a stay 84 which is mounted on the top of a piping 173 (see FIG. 2) extending through the hollow interior of the base block 171 and secured to the base 17 and the base block 171. The positioning marks 813 and 823 which are printed inside the respective circular coils are utilized for centering the respective circular coils.

Stated differently, the rotational coupling transformer Trn comprises the pair of circular coils 812 and 812 which are disposed coaxially and are of an equal diameter and disposed in parallel spaced relationship for a magnetic coupling which is effective to transmit an output from the circuit 3 to the television set 6. Accordingly, any microscopic unevenness of the individual coils or a distortion in the spacing therebetween are averaged out over the entire perimeter of their respective coils, and their relative rotation do not produce noises which have any periodicity. Since each coil has a frequency response, common noises are cut off between them. It will further be seen that each coiled plate is simple to manufacture, and the identical construction is advantageous in reducing the cost required.

The slip ring unit SLP comprises a metal ring and a brush which is disposed for sliding contact with the ring (both not shown). The ring is supported by a cylinder which is secured to the piping 173 (see FIG. 2b) while the brush is supported by a bracket which is mounted on the rotary mount 16. In order to minimize the area of sliding contact, the constant voltage supply 72 is mounted on the rotary mount 16 (see FIG. 2a) and is fed from a stationary power supply 71 (see FIG. 7a) through a two wire system feeding 100 V, A.C., thus producing various voltages of fixed magnitudes within the rotational system. The hollow interior of the piping 173 allows the coaxial cable associated with the rotational coupling transformer Trn and the supply line associated with the stationary unit for the slip ring unit SLP to pass therethrough. When an antenna system of the kind described is installed on a moving body such as an automobile, an outside location, for example, a roof is chosen for its mounting location. Accordingly, the radom RDM covers the entire system in order to protect it from dusts and weather (see FIG. 2b). The radom RDM is a three tier structure comprising outer and inner shells formed of FRP having a thickness of about 1 mm and about 4 mm thick core of foamed styrol which is interposed therebetween, thus securing a minimized transmission loss and sufficient strength against vibration and wind pressures.

Mounted on the base 17 is a cooling fan Fan which is driven by an a.c. motor Mf which is fed from the power supply 71 whenever the power switch 61 of the television set 6 is turned on, thus preventing any significant temperature rise within the radom RDM.

SECOND EMBODIMENT

Figure 7A:
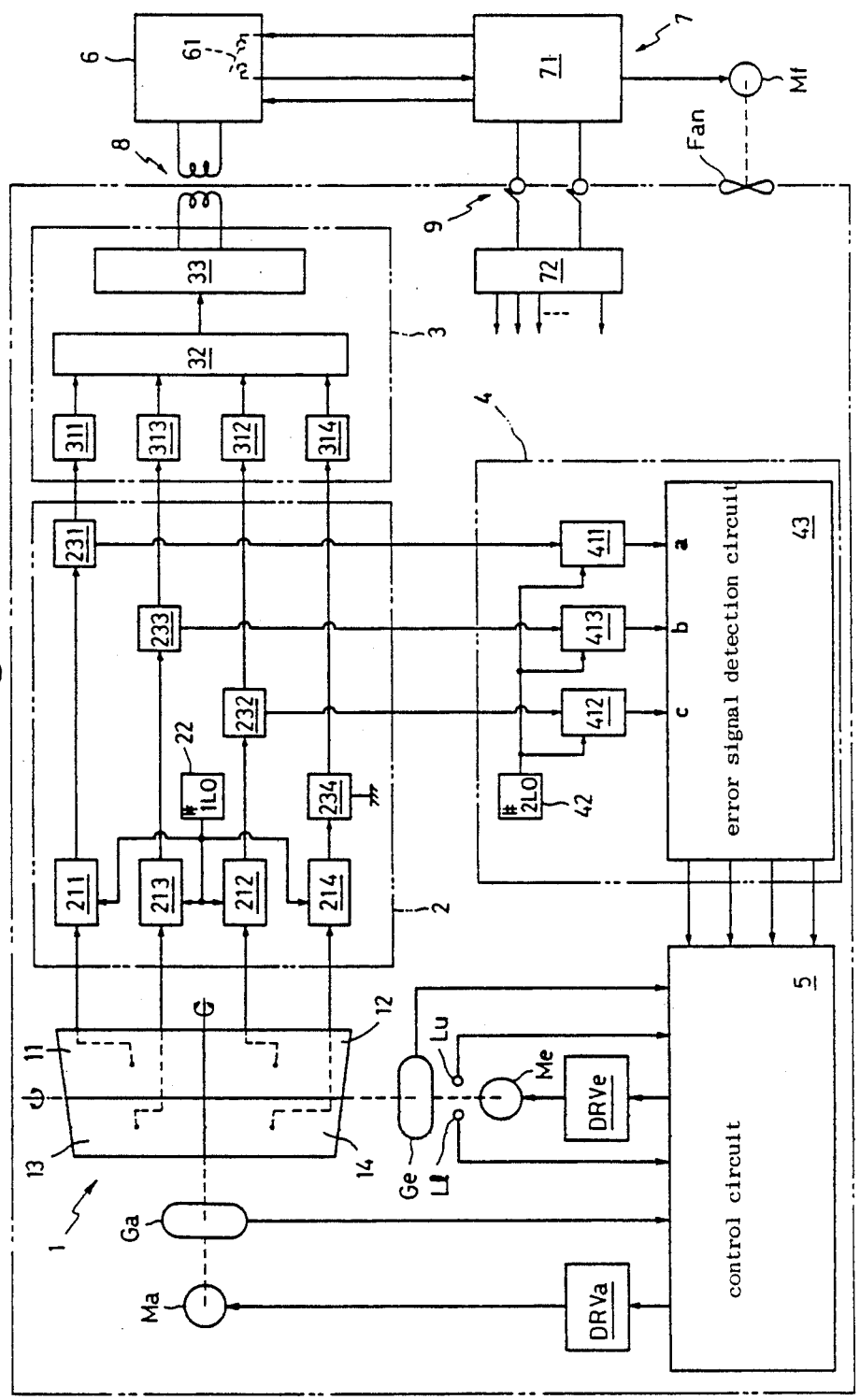
FIG. 7a is a block diagram of a second embodiment of the invention.

FIG. 7a shows a second embodiment including a common signal processing circuit 2 which includes four identical BS converters 211 to 214, a first local oscillator (#1LO) 22 and four identical splitters 231 to 234. A signal received by each plane antenna is input to a corresponding BS converter which is designated by the same least significant digit in the reference numerals. A first common local oscillator signal having a fixed frequency which is supplied from the first local oscillator 22 is fed to each of the BS converters to convert a high frequency signal of about 12 GHz which is fed from the associated plane antenna to a first intermediate frequency signal of about 1.3 GHz, and each splitter is operable to split an output signal from the associated converter into two portions, which are fed to the received signal processing circuit 3 and the error signal processing circuit 4, respectively. However, it should be noted that the output signal from the converter 214 which is split by the splitter 234 is only fed to the received signal processing circuit 3.

The received signal processing circuit 3 comprises four identical attenuators 311 to 314, a combiner 32 and an amplifier 33. Each attenuator adjusts the level of an output signal from the associated BS converter which is fed through the corresponding splitter, and the combiner 32 synthesizes the level adjusted signals from the attenuators. The amplifier 33 amplifies the synthesized signal and deliver it through the coupling transformer Trn to the television set 6. It will be understood that the television set 6 is provided with a BS tuner, which demodulates the signal from the circuit 3 to deliver video and voice outputs. The remaining split signals from the splitters 231, 232 and 233 are fed to the error signal processing circuit 4.

The error signal processing circuit 4 comprises three identical BS tuners 411 to 413, a second local oscillator (#2LO) 42 and an error signal detection circuit 43. Each of the tuners is fed with a common, second local oscillator signal having a fixed frequency from the second local oscillator 42, and is operable to convert an output signal from the associated converter which is fed through the corresponding splitter to a second intermediate frequency signal about of 403 MHz.

The error signal detection circuit 43 utilizes output signals from the BS tuners to derive an azimuth error signal representing a declination of the directivity of the antenna unit 1, or equivalently, the directivity of each plane antenna, in the azimuth direction with respect to the direction of the oncoming radio wave or the direction on which the broadcasting satellite is located, and an elevation error signal representing a declination of the directivity of the antenna unit 1 in the elevation direction with respect to the direction of the oncoming radio wave.

Figure 7B:
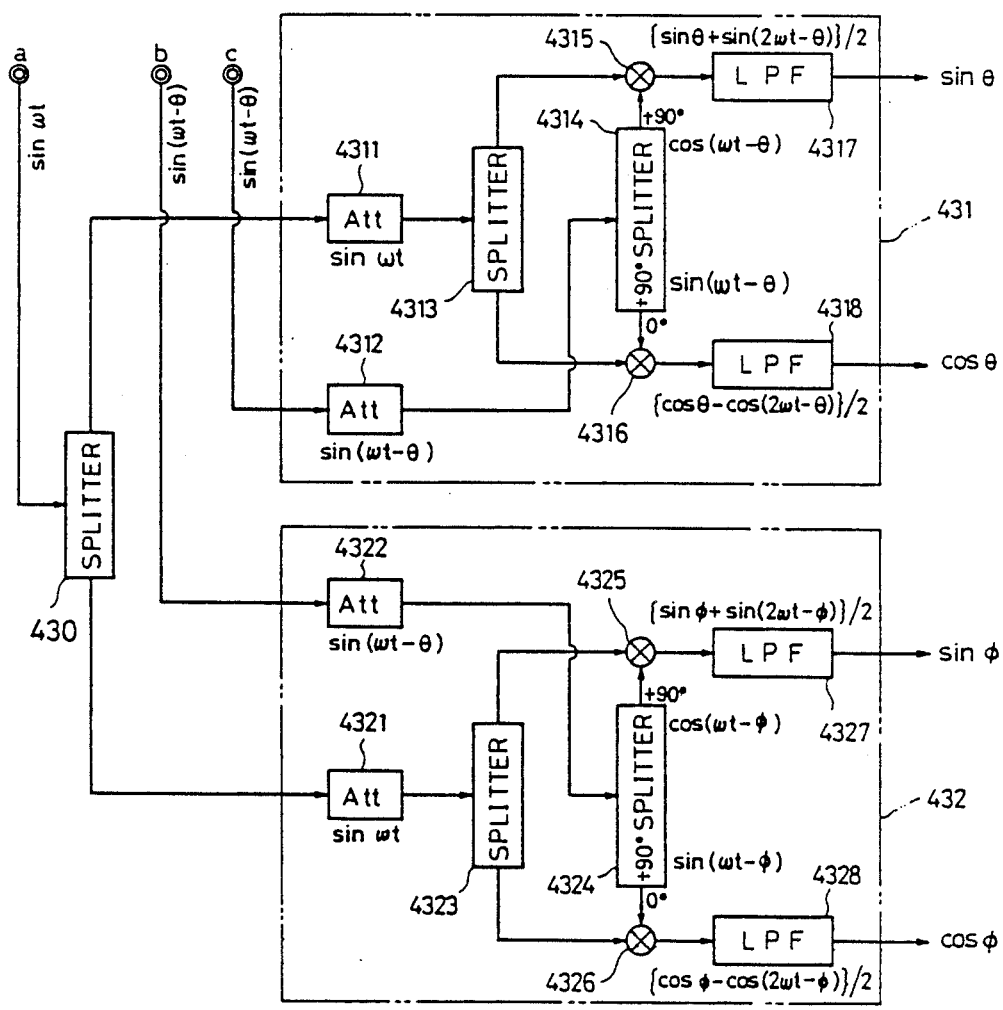

FIG. 7b shows the error signal detection circuit 43 in detail. To help understanding the function of this circuit, a supplementary description of the principle of detecting each error signal will be in order. Specifically, the spacing between individual plane antennas on the antenna bracket 15 will be negligibly small as compared with the distance from the broadcasting satellite to the earth surface, but is not negligible as compared with the wavelength of the radio wave received. Thus, the radio wave received by the individual plane antennas will be substantially equal to each other in signal strength, but is not uniform in the phase of the signal.

Figure 10A:
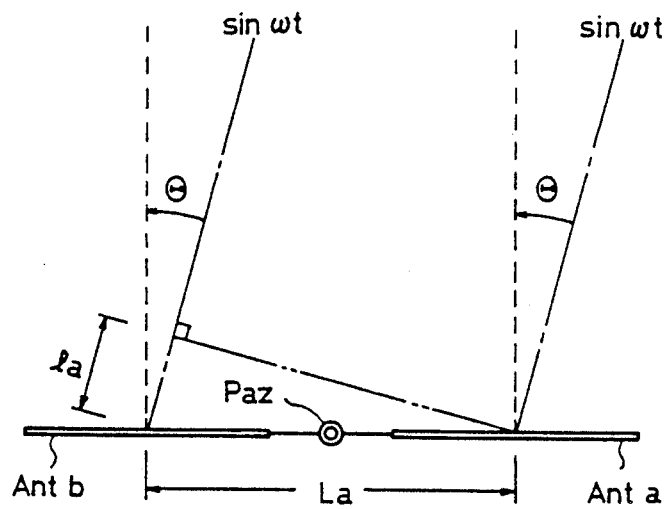
FIGS. 10a and 10b are illustrations for explaining the detection of a declination of antennas in the systems of the second and the third embodiment.

Referring to FIG. 10a, a pair of plane antennas which are spaced apart in the azimuth direction, namely, a combination of plane antennas 11 and 12 or a combination of plane antennas 13 and 14, are symbolically represented by a pair of antennas Ant a and Ant b which are spaced apart by a distance of La for rotation about the pivot Paz. The directivity of each antenna is indicated by broken lines, and the direction of oncoming radio wave from a broadcasting satellite is indicated by a single dot phantom line, it being assumed that these radio waves are substantially parallel waves in view of the spacing La which is negligibly small as compared with the distance from the broadcasting satellite to the earth surface. The wave front is indicated by double dot phantom lines.

Assume now that a declination in the azimuth direction is $\Theta$, taking CCW direction as positive as referenced to the direction of the oncoming radio wave. In this instance, the wave reaching the antenna Ant b travels through an additional path length of la as compared with the wave reaching the antenna Ant a, and hence will be lagging in phase. Thus, representing the signal received by the antenna Ant b by sin $\omega t$, the signal received by the antenna Ant b will be expressed as follows:

$$\sin \omega (t - la/c)$$
$$= \sin (\omega t - 2\pi \cdot La \cdot \sin \Theta/\lambda) \tag{1a}$$

where $\omega$ represents the angular velocity of the wave, c the velocity of propagation and $\lambda$ the wavelength.

Representing the phase lag $2\pi \cdot La \cdot \sin \Theta/\lambda$ of the signal received by the antenna Ant b by $\theta$, the multiplication of the signals received by the both antennas Ant a and Ant b produce a signal indicated as follows:

$$\sin \omega t \cdot \sin (\omega t - \theta)$$
$$= \{\cos \theta - \cos (2\omega t + \theta)\}/2 \tag{2a}$$

Similarly, the multiplication of the signal received by the antenna Ant a by the signal received by the antenna Ant b which is phase shifted by $+90°$ yields:

$$\sin \omega t \cdot \cos (\omega t - \theta)$$
$$= \{\sin \theta + \sin (2\omega t - \theta)\}/2 \tag{3a}$$

By extracting d.c. components from these signals, there will be obtained a sine representation of the phase lag $\theta$ of the signal received by the antenna Ant b with respect to that received by the antenna Ant a (a negative value of the phase lag representing a phase advance) and a cosine representation of azimuth error signal $\cos \theta$, and from these, a declination $\Theta$ in the azimuth direction can be determined. It should be noted that the cosine and the sine representation of the azimuth error signal may be inclusively referred to as an azimuth error signal.

In a similar manner, a declination in the elevation direction may be determined, taking the upward direction as positive as referenced to the direction of an oncoming radio wave.

Figure 10B:
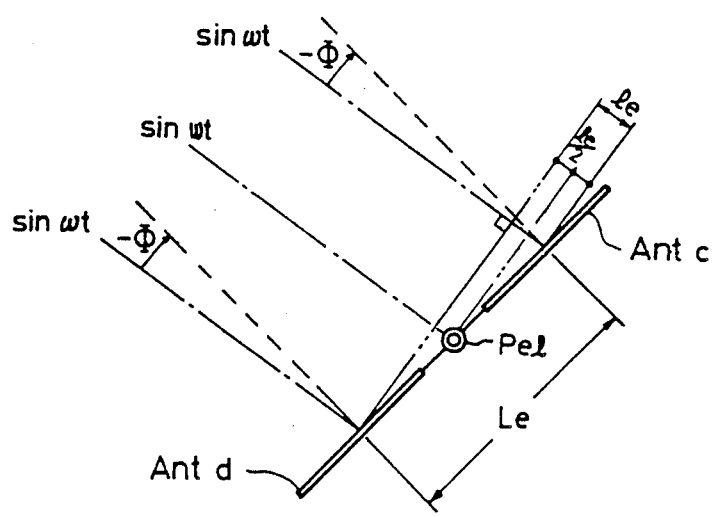

Referring to FIG. 10b, a pair of plane antennas such as a combination of the antennas 11 and 13 or antennas 12 and 14 which are spaced apart in the plane of rotation in the elevation direction are symbolically illustrated by a pair of antennas Ant c and Ant d which are spaced apart by a distance Le therebetween for rotation about a pivot Pel. Representing a signal received by the antenna Ant c by sin $\omega t$, a signal received by the antenna Ant d has a phase lag $\phi$ which is equal to $-2\pi \cdot Le \cdot \sin \Phi/\lambda$ or a phase advance. In the similar manner as before, the signal received by the antenna Ant c may be multiplied by the signal received by the antenna Ant d either directly or as phase shifted by $+90°$:

$$\sin \omega t \cdot \sin (\omega t - \phi)$$
$$= \{\cos \phi - \cos (2\omega t - \phi)\}/2 \tag{4a}$$

$$\sin \omega t \cdot \cos (\omega t - \phi)$$
$$= \{\sin \phi - \sin (2\omega t - \phi)\}/2 \tag{5a}$$

By extracting d.c. components of these signals, there can be obtained a sine representation and a cosine representation of a phase lag $\phi$ of the signal received by the antenna Ant d with respect to the signal received by the antenna Ant c, which is caused by a declination $\Phi$ in the elevation direction, (a negative value of the phase lag representing a phase advance) sin $\phi$ and cos $\phi$, thus allowing the declination $\Phi$ in the elevation direction to be determined. Both of these representations may collectively be referred to an elevation error signal.

It is to be noted that the phase differences $\theta$ and $\phi$ of the respective antennas can be obtained as a geometrically continuous functions or in the form of $2\pi \cdot La \cdot \Theta/\lambda$ and $2\pi \cdot Le \cdot \sin \Phi/\lambda$ over an angular range which corresponds to the main lobe of the directivity response of the associated antenna (see FIG. 4a).

Referring to FIG. 7b, it will be noted that the azimuth error signal and the elevation error signal can be determined by a common procedure. Accordingly, the error signal detection circuit 43 includes an azimuth error signal detector 431 and an elevation error signal detector 432, both of which are constructed in an identical manner.

Specifically, an output signal from the tuner 411 is applied to the splitter 430 at its terminal a, and is split to the both detectors 431 and 432. Similarly, an output signal from the tuner 412 is applied to the detector 432 at its terminal b, and an output signal from the tuner 413 is applied to the detector 431 at its terminal c.

The output signal from the tuner 411 which is applied to the detector 431 is subject to a level adjustment by means of an attenuator 4311, and is again splitted by a splitter 4313 to be fed to mixers 4315 and 4316. The output signal from the tuner 413 is subject to a level adjustment in an attenuator 4312, and is then split by $+90°$ splitter 4314, one of the outputs of which is fed to the mixer 4315 after having been subject to a $+90°$ phase shift while the other output is directly fed to the mixer 4316.

The mixer 4315 multiplies the output signal from the tuner 411 by the output signal from the tuner 413 which has been phase shifted by $+90°$ to perform the calculation according to the equation (3a). The mixer 4316 multiplies the output signal from the tuner 411 by the output signal from the tuner 412 to perform the calculation according to the equation (2a). A low pass filter 4317 is effective to eliminate a.c. components from the output signal of the mixer 4315 to provide a sine azimuth error signal sin $\theta$, and a low pass filter 4318 is effective to eliminate a.c. components from the output signal of the mixer 4316 to provide a cosine azimuth error signal cos $\theta$.

The elevation error signal detector 432 utilizes the output signals from the tuners 411 and 413 to perform calculations according to the equations (4a) and (5a), and processed signals are filtered as at 4327 and 4328 to eliminate a.c. components therefrom, thus providing a cosine elevation error signal cos $\phi$ and a sine elevation error signal sin $\phi$. The manner of processing remains to be completely identical to that taking place in the detector 431, and will not be specifically described.

The azimuth error signal and the elevation error signal produced by the error signal detection circuit 43 is applied to the control circuit 5, which then derives azimuth offset data (Da) and elevation offset data (De) representing a modification to be applied to the directivity of the antenna unit 1 in response to these error signals. The former data is applied to the azimuth motor driver DRVa while the latter data is applied to the elevation motor driver DRVe.

THIRD EMBODIMENT

Figure 9A:
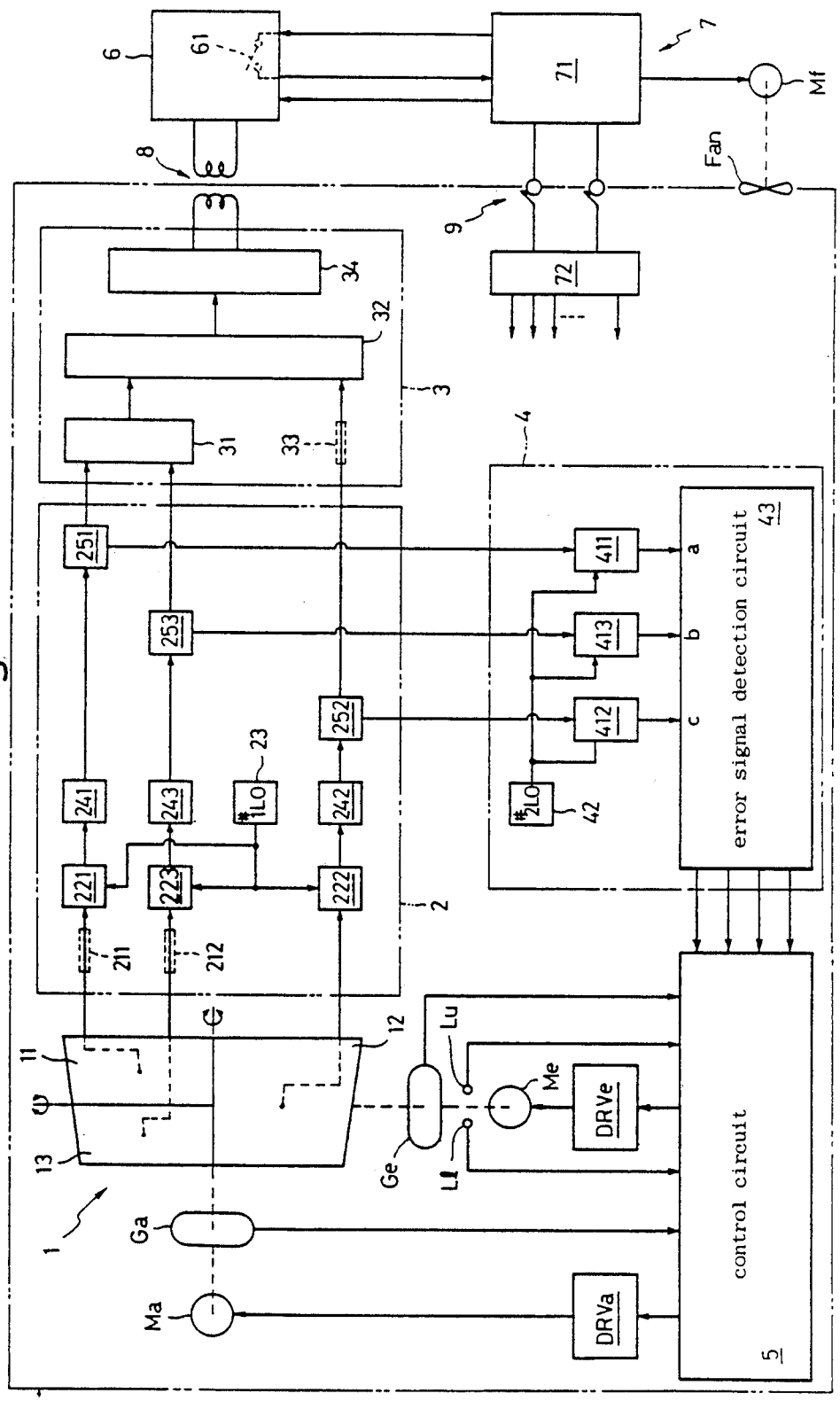
FIG. 9a is a block diagram of a third embodiment of the invention.

Referring to FIG. 9a which shows a third embodiment of the invention, the antenna system includes three plane antennas 11, 12 and 13 for detecting the direction of an oncoming radio wave or the direction on which a broadcasting satellite is located and for receiving a satellite broadcasting. Plane antennas 11 and 12 are identical in configuration while the plane antenna 13 has a configuration which represents the combination of the plane antennas 11 and 12 joined together. In other words, the plane antennas 12 and 14 shown in the first and the second embodiment is replaced by a single broad area plane antenna 12 in the third embodiment.

Signals received by these antennas 11 to 13 are fed to a common signal processing circuit 2, which comprises delay lines 211, 212, BS converters 221, 222 and 223, a first local oscillator (#1LO) 23, I.F. amplifiers 241, 242 and 243 and splitters 251 and 252. The delay lines 211 and 212 are coordinated so as to compensate for a phase deviation which may be caused by the transmission of the signals received by the respective plane antennas.

Each of the BS converters is effective to convert a high frequency signal of about 12 GHz which is supplied from its associated plane antenna, having the common least significant digit in the both reference numerals, to a first intermediate frequency signal of about 1.3 GHz, utilizing a common, first local oscillator signal having a fixed frequency which is supplied by a first local oscillator 22. Each I.F. amplifier amplifies an output signal from the associated converter so that the signal levels are equal to each other under a reference condition in which the directivity of the antenna unit 1 is aligned with the direction of an oncoming radio wave and in which there are no disturbances.

Each splitter divides the output of the associated I.F. amplifier into two portions, one of which is fed to a received signal processing circuit 3 while the other is fed to an error signal processing circuit 4.

The received signal processing circuit 3 comprises a pair of combiners 31, 32, a delay line 33 and an amplifier 34. The combiner 31 is effective to synthesize a signal from the splitter 251, corresponding to the signal received by the plane antenna 11, with a signal from the splitter 253, corresponding to the signal received by the plane antenna 13, and the combiner 32 is effective to synthesize the resultant signal with a signal from the splitter 252, which corresponds to the signal received by the plane antenna 12. The delay line 33 compensates for a phase lag caused by the combiner 31. The amplifier 34 amplifies the resultant signal from the combiner 32 and delivers it to the television set 6 through a rotational coupling transformer Trn. The television set 6 is provided with a BS tuner, which demodulates the signal from the received signal processing circuit 3 to deliver video and a voice outputs.

The remaining outputs from the splitters 251, 252 and 253 are fed to the error signal processing circuit 4, which comprises three identical BS tuners 411, 412 and 413, a second local oscillator (#2LO) 42 and an error signal detection circuit 43. Each of these tuners is fed with a common, second local oscillator signal having a fixed frequency from the second local oscillator 42, and operates to convert the output signal from the associated BS converter as supplied through the associated splitter to a second intermediate frequency signal of about 403 MHz.

The error signal detection circuit 43 utilizes the output signals from these BS tuners to derive an azimuth error signal representing a declination of the directivity of the antenna unit in the azimuth direction with respect to the direction of the oncoming radio wave, and an elevation error signal representing a declination of the directivity of the antenna unit 1 in the elevation direction with respect to the direction of the oncoming radio wave.

Figure 9B:
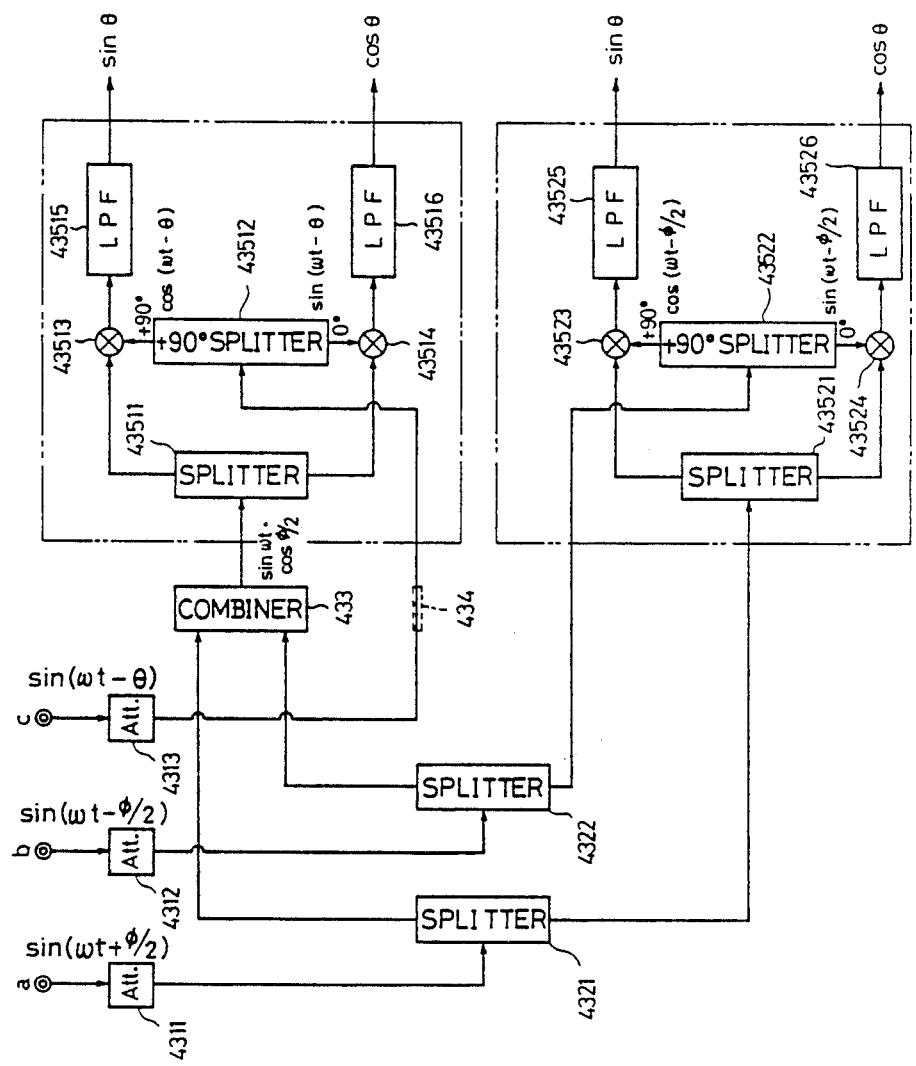

FIG. 9b shows the error signal detection circuit 43 in detail. It will be understood that this circuit operates in a same manner as the corresponding circuit 43 shown in FIG. 7b. However, because of a difference in the size between the individual plane antennas, there is some difference in the principle of detecting error signals, which will be described with reference to FIG. 10a, which illustrates a combination of an imaginary antenna having the same dimensions as the plane antenna 12 and such plane antenna 12, which is intended to be substituted for the combination of the plane antennas 11 and 13. At this end, this combination is symbolically illustrated by a pair of antennas Ant a and Ant b which is spaced apart by a distance La for rotation about a pivot Paz in a plane corresponding to the azimuth direction. The broken lines, the single dot phantom lines and the double dot phantom lines indicate the directivity of the respective antennas, the oncoming radio wave and the wave front, respectively, as before.

It is assumed that a declination in the azimuth direction is $\Theta$, taking the counter-clockwise direction as positive as referenced to the direction of the oncoming radio wave. Because the wave reaching the antenna Ant b travels through an additional path length of la as compared with the wave reaching the antenna Ant a, it undergoes a phase lag. Thus, representing a signal received by the antenna Ant a by $\sin \omega t$, a signal received by the antenna Ant b can be expressed as follows:

$$\sin \omega (t - la/c)$$

$$= \sin (\omega t - 2\pi \cdot La \cdot \sin \Theta / \lambda) \tag{1b}$$

where $\omega$ represents the angular velocity of the wave, c the velocity of propagation and $\lambda$ the wavelength.

Representing the phase lag of the signal received by the antenna Ant b, $2\pi \cdot La \cdot \sin \Theta / \lambda$, by $\theta$, the multiplication of the signals received by the both antennas yields a following signal:

$$\sin \omega t \cdot \sin (\omega t - \theta)$$

$$= \{\cos \theta - \cos (2\omega t - \theta)\}/2 \tag{2b}$$

Similarly, the multiplication of the signal received by the antenna Ant a by the signal received by the antenna Ant b which is phase shifted by $+90°$ yields the following:

$$\sin \omega t \cdot \cos (\omega t - \theta)$$

$$= \{\sin \theta - \sin (2\omega t - \theta)\}/2 \tag{3b}$$

By extracting d.c. components from these signals, a sine representation and a cosine representation of a phase lag (which represents a phase advance when its value assumes a negative value) of the signal received by the antenna Ant b with respect to the signal received by the antenna Ant a, sin θ and cos θ, which are attributable to the declination Θ in the azimuth direction will be derived, thus allowing the declination Θ to be determined. Both of these representations may be collectively referred to as an azimuth error signal.

In quite the same manner, the declination Φ in the elevation direction can be determined, for which the downward direction will be taken positive as referenced to the direction of the oncoming radio wave. This is illustrated in FIG. 10b where a pair of spaced plane antennas, namely, antennas 11 and 13 are sympolically illustrated by antennas Ant c and Ant d which are spaced apart by a distance Le for rotation about the pivot Pel. Representing the signal received by the imaginary antenna mentioned above by sin ωt, the signal received by the antenna Ant c has a phase which is advanced by $-\pi \cdot Le \cdot \sin \Phi / \lambda$ with respect thereto while the signal received by the antenna Ant d has a phase which is lagging by $-\pi \cdot Le \cdot \sin \Phi / \lambda$ with respect thereto.

Representing $-\pi \cdot Le \cdot \sin \Phi / \lambda$ by $\phi/2$, and multiplying the signal received by the antenna Ant c by the signal received by the antenna Ant d as received or as phase shifted by +90°, we have:

$$\sin (\omega t + \phi/2) \cdot \sin (\omega t - \phi/2)$$

$$= (\cos \phi - \cos 2\omega t)/2 \quad (4b)$$

$$\sin (\omega t + \phi/2) \cdot \cos (\omega t - \phi/2)$$

$$= (\sin \phi + \sin 2\omega t)/2 \quad (5b)$$

By extracting d.c. components from these signals, a sign representation and a cosine representation of a phase lag φ (which represents a phase advance when assuming a negative value) of the signal received by the antenna Ant d with respect to the signal received by the antenna Ant c, sin φ and cos φ, or elevation error signals can be obtained, allowing the declination Φ in the elevation direction to be determined. These error signals may be collectively referred to as an elevation error signal.

As before, the phase differences θ and φ can be obtained as geometrically continuous functions or in the form of $2\pi \cdot La \cdot \sin \Theta/\lambda$ and $2\pi \cdot Le \cdot \sin \Phi/80$ over an angular range which corresponds to the main lobe represented by the directivity response of the associated antennas (see FIG. 4a).

Referring to FIG. 9b, the error signal detection circuit 43 comprises attenuators 4311, 4312 and 4313, splitters 4321 and 4322, a combiner 433, a delay line 434, an azimuth error signal detector 4351 and an elevation error signal detector 4352. Output signals from the individual BS tuners are applied from terminals a, b and c to assotiated attenuators for purpose of level adjustment.

The splitter 4321 distributes an output from the attenuator 4311, and the splitter 4322 distributes an output from the attenuator 4312, to the combiner 433 and the elevation error signal detector 4352, respectively. The combiner 433 synthesizes the distributed signals from the splitter 4322 for application to the detector 4351. Representing the signals applied to the terminals a and b as sin (ωt−φ/2) and sin (ωt+φ/2) as in the above example, the synthesized signal will be represented as sin ωt·cos φ/2, thus including an amplitude component cos φ/2, the treatment of which will be described later.

The delay line 434 compensates for a time delay caused in the signal from the splitter 4321 or 4322 and the combiner 433 with respect to the output signal from the attenuator 4313 before they are fed to the azimuth error signal detector 4351. The detector 4351 comprises a splitter 43511, +90° splitter 43512, mixers 43513 and 43514 and low pass filters (LPF) 43515 and 43516.

The splitter 43511 splits the signal from the combiner 433 for distribution to the mixers 43513 and 43514, and +90° splitter 43512 splits the output signal from the attenuator 4313 as transmitted through the delay line 434 and delivers one of the outputs which is phase shifted by +90° to the mixer 43513 and delivers the other directly to the mixer 43514.

The mixer 43514 multiplies its inputs to perform the calculation according to the equation (3b), and the mixer 43514 multiplies its inputs to perform the calculation according to the equation (2b). Thus, a sine azimuth error signal sin θ is obtained when a.c. components are removed from the output signal of the mixer 43513 by LPF 43515, and a cosine azimuth error signal cos θ is obtained when a.c. components are removed from the output signal of the mixer 43514 by LPF 43516.

The elevation error signal detector 4352 is constructed in an identical manner as the detector 4351, and utilizes the signals from the splitters 4321 and 4322 to perform the calculations according to the equations (4b) and (5b). When a.c. components are removed from the signals thus processed, there is obtained a sine elevation error signal sin φ and a cosine elevation error signal cos φ.

The azimuth error signal and the elevation error signal thus produced by the error signal detection circuit 43 is applied to the control circuit 5. In a similar manner as in the first embodiment, the control circuit 5 derives azimuth offset data (Da) and the elevation offset data (De) which indicates a modification to be applied to the directivity of the antenna unit 1 in response to these error signals, and delivers the former to the azimuth motor driver DRVa and the latter to the elevation motor driver DRVe.

The features of the above embodiments may be summarized as follows:

1. Since a deviation or declination of the directivity of the antenna unit with respect to the direction of an oncoming radio wave is detected based on phase differences between signals which are received by four plane antennas disposed on a common plane and which are thus subject to a change in their attitudes in an integral manner, there is no fading effect which may be caused by a tracking operation.

2. A sine and cosine representation of phase differences between signals received by the individual antennas as a result of a declination are used to derive a ratio therebetween, which is represented by a tangent function, which is then used to calculate a phase difference, thus substantially eliminating influences of the declination or receiving environment upon the reception level, thus stabilizing the tracking operation.

3. A helical scanning is utilized in effecting the detection of a peak value from a means square of the cosine and sine representation in order to search for the direction of an oncoming radio wave, and thus the reliability for initializing the antenna unit is enhanced.

4. The positive or negative polarity of the cosine and the sine representation of a phase angle between individual signals received which are caused by a declination of the antenna unit are used to determine the quadrant in which the phase angle is located, and the phase angle in that quadrant is calculated from a ratio therebetween, which is represented by a tangent function, thus allowing an accurate tracking operation which is free from a pointing error.

5. In the event a sufficient reception level is not assured as a result of a wave shielding effect upon the antenna unit, gyro data is used to adjust the directivity of the antenna in dependence upon any change in the travelling direction of the automobile, whereby the tracking operation which is based upon the reception level can be resumed relatively rapidly whenever a normal receiving environment is recovered.

6. During the tracking control based on the reception level, the gyro or gyros are reset each time a high probability is found that the directivity of the antenna unit is aligned with the direction of the oncoming radio wave, so that the gyros are susceptible to little drift effect, thus allowing the gyros which are small and light in weight, and hence having a reduced moment of inertia to be used.

7. During the processing of signals received by the individual plane antennas, the common circuit 2 converts the received signal to a first intermediate frequency signal for distribution to the received signal processing circuit 3 and the error signal processing circuit 4. In the circuit 4, the first intermediate frequency signal fed thereto is again converted to a second intermediate frequency signal, but its processing operation takes place independently from the received signal processing circuit 3, and hence its local oscillator 42 may have a fixed frequency, thus simplifying a circuit arrangement and avoiding the need for a remote control of the second local oscillator signal. This allows the processing circuit to be confined within the rotational system, dispensing with the need for a connection between the rotational system and an external system which will be required otherwise for a remote control purpose.

8. The received signal processing circuit 3 provides a high gain since the first intermediate frequency signal is synthesized.

9. The first intermediate frequency signal which is synthesized by the received signal processing circuit 3 is transmitted externally of the rotational system by means of the rotational coupling transformer 8, which removes common noises and prevents of the occurence of noises as a result of transmission between different motional systems.

10. The constant voltage supply 72 is mounted on the rotary mount 16 to produce various voltages of given magnitudes within the rotational system and is fed with 100 V, A.C. from the stationary power supply 71 through a two wire system. In other words, only two electrical connections are required between the rotational system and the external system, enhancing the reliability and the durability of the system.

In the described embodiments, a helical scanning over an extended range takes place in order to initialize the attitude of the antenna unit 1. However, the scanning range may be limited by supplying reception area data to the control unit 5, or such shifting may be determined by a driver operating an up/down key. Or these techniques may be used in combination.

The thresholds THag and THer at which the gyros are reset are fixed in the described embodiment. However, such threshold or thresholds may be updated in dependence upon the reception level at the completion of initializing the antenna unit as a result of the helical scanning and the detection of a peak value. In addition, the gyros may be reset each time the antenna attitude is updated in response to the error signals without reliance upon the reception level. It will be appreciated that a higher reliability for the gyro data will be attained when the gyros are reset as the reception level exceeds the threshold.

Finally, in the described embodiments, the individual plane antennas of the antenna unit 1 also serve as receiving antennas, but the receiving antenna may be functionally separated from tracking antennas. Thus, a pilot antenna system which is used for detecting the direction of an oncoming radio wave may be provided separately from a receiving antenna system which receives a satellite broadcasting, and the attitude of the receiving antenna system may be controlled by attitude data fed from the pilot antenna system. In this instance, a gain required of the individual antennas in the pilot antenna system may be small, thus allowing the size and the weight of such system to be reduced to permit a greater response.

What we claimed is:

1. An antenna system comprising
an antenna support;
drive means for driving the antenna support for rotation about a single axis;
a first and a second antenna mounted on the antenna support and spaced apart from each other in the direction of rotation, the first and the second antenna having respective directivities which are oriented parallel to each other;
functional value detecting means for detecting a value of a first function and a value of a second function which is orthogonal to the first function, each of the functions including a phase difference of the signal received by the second antenna with respect to the signal received by the first antenna as a parameter;
and control means for detecting the phase difference in terms of a ratio of a value of the first function to a value of the second function, and for determining a quadrant in which the phase difference is located from the positive or negative polarity of the values of the first and the second function, the control means energizing the drive means in the direction to reduce the detected phase difference and a declination of the directivity of the first antenna with respect to the travelling direction of the wave in the associated quadrant substantially zero.

2. An antenna system according to claim 1 in which the first antenna comprises a plane antenna and the second antenna comprises a plane antenna having a surface for receiving an electromagnetic wave on an extension of the surface of the first antenna on which an electromagnetic wave is received.

3. An antenna system comprising
an antenna support;
drive means for driving the antenna support for rotation about a single axis;
a first and a second antenna disposed on the antenna support and spaced apart in the direction of rotation, the both antennas having directivities which are oriented parallel to each other;
functional value detecting means for detecting a value of a first function and a value of a second function which is orthogonal to the first function, each of the functions having a phase difference of a signal received by the second antenna with respect to a signal received by the first antenna as a parameter;

and control means for deriving a mean square of the values of the first and the second function, the control means energizing the drive means in a direction to maximize the mean square, the drive means subsequently detecting the phase difference on the basis of a ratio of the value of the first function to the value of the second function, the control means determining a quadrant in which the phase difference is located from the positive or negative polarity of the values of the first and the second function, the control means energizing the drive means in a direction to reduce the detected phase difference and the declination of the directivity of the first antenna with respect to the travelling direction of the wave as occurring in the quadrant substantially zero.

4. An antenna system comprising
an antenna support;
first drive means for driving the antenna support for rotation in an azimuth direction about an axis;
second drive means for driving the antenna support for rotation in an elevation direction about another axis which is perpendicular to the first mentioned axis;
a first and a second antenna disposed on the antenna support and spaced apart in the azimuth direction, the both antennas having directivities which are oriented parallel to each other;
a third and a fourth antenna disposed on the antenna support and spaced apart from each other in the azimuth direction and are also spaced from the first and the second antenna in the elevation direction, the third and the fourth antenna having directivities which are oriented parallel to the directivity of the first antenna;
first detection means for detecting a value of a first function and a value of a second function which is orthogonal to the first function, each of the first and the second functions having a phase difference of a signal received by the second antenna with respect to a signal received by the first antenna as viewed in the azimuth direction as a parameter;
second detection means for detecting a value of a third function and a value of a fourth function which is orthogonal to the third function, each of the third and the fourth function having a phase difference of a signal received by the third antenna with respect to a signal received by the fourth antenna as viewed in the elevation direction as a parameter;
and control means for deriving a ratio of the value of the first function to the value of the second function to detect a phase difference in the azimuth direction, and for determining a quadrant in which the phase difference in the azimuth direction is located from positive or negative polarity of the values of the first and the second function, the control means energizing the first drive means so as to reduce the phase difference detected in the azimuth direction and a declination in the azimuth direction of the directivity of the first antenna with respect to a travelling direction of a radio wave which corresponds to such quadrant substantially zero, the control means also deriving a ratio of the value of the third function to the value of the fourth function to detect a phase difference in the elevation direction, and for determining a quadrant in which the phase difference in the elevation direction is located from positive or negative polarity of the values of the third and the fourth function, the control means energizing the second drive means for reducing the phase difference detected in the elevation direction and a declination in the elevation direction of the directivity of the first antenna with respect to a travelling direction of a radio wave which corresponds to such quadrant substantially zero.

5. An antenna system according to claim 4 in which the first antenna comprises a plane antenna and the second antenna comprises another plane antenna having a surface which receives an electromagnetic wave and which is disposed on an extension of a surface of the first antenna which receives an electromagnetic wave.

6. An antenna system comprising
an antenna support;
first drive means for driving the antenna support for rotation in an azimuth direction about an axis;
second drive means for driving the antenna support for rotation in an elevation direction about another axis which is perpendicular to the first mentioned axis;
a first and a second antenna disposed on the antenna support and spaced apart from each other in the azimuth direction, the both antennas having directivities which are oriented parallel to each other;
a third and a fourth antenna disposed on the antenna support and spaced apart from each other in the azimuth direction and also spaced from the first and the second antenna in the elevation direction, the third and the fourth antenna having directivities which are oriented parallel to the directivity of the first antenna;
first detecting means for detecting a value of a first function and a value of a second function which is orthogonal to the first function, both the first and the second function having a phase difference of a signal received by the second antenna with respect to a signal received by the first antenna as viewed in the azimuth direction as a parameter;
second detecting means for detecting a value of a third and a value of a fourth function which is orthogonal to the third function, both the third and the fourth function having a phase difference of a signal received by the third antenna with respect to a signal received by the first antenna as viewed in the elevation direction as a parameter;
and control means for deriving a mean square of the values of the first and the second function and for energizing the first drive means in order to maximize the mean square, the control means also deriving a mean square of values of the third and the fourth function and for energizing the second drive means to maximize the mean square thereof, the control means subsequently detecting a phase difference in the azimuth direction on the basis of the ratio of the value of the first function to the value of the second function and determining a quadrant in which the phase difference in the azimuth direction is located from positive or negative polarity of values of the first and the second function, the control means energizing the first drive means in order to reduce the phase difference detected in the azimuth direction and a declination of the directivity of the first antenna with respect to the travelling direction of a radio wave as viewed in the azimuth direction which corresponds to such quadrant substantially zero, the control means also detecting a phase difference in the elevation direction on the basis of a ratio of the value of the third function to the value of the fourth function and for determining a quadrant in which the phase difference in the elevation direction is located from positive or negative polarity of values of the third and the fourth function, the control means energizing the second drive means in order to reduce the phase difference detected in the elevation direction and a declination of the directivity of the first antenna with respect to the travelling direction of a radio wave as viewed in the elevation direction substantially zero.

7. An antenna system comprising
an antenna support;
first drive means for driving the antenna support for rotation in an azimuth direction about an axis;
second drive means for driving the antenna support for rotation in an elevation direction about another axis which is perpendicular to the first mentioned axis;
a first and a second antenna disposed on the antenna support and spaced apart from each other in the azimuth direction, the both antennas having directivities which are oriented parallel to each other;
a third antenna disposed on the antenna support and spaced apart from the second antenna in the azimuth direction and also spaced from the first antenna in the elevation direction, the third antenna having a directivity which is oriented parallel to the directivity of the first antenna;
first detecting means for detecting a value of a first and a value of a second function which is orthogonal to the first function, each of the first and the second function having a phase difference of a signal received by the second antenna with respect to a signal received by the first antenna as viewed in the azimuth direction as a parameter;
second detecting means for detecting a value of a third function and a value of a fourth function which is orthogonal to the third function, both the third and the fourth function having a phase difference of a signal received by the third antenna with respect to a signal received by the first antenna as viewed in the elevation direction as a parameter;
and control means for deriving a ratio of a value of the first function to a value of the second function to detect a phase difference in the azimuth direction, and for determining a quadrant in which the phase difference in the azimuth direction is located from positive or negative polarity of values of the first and the second function, the control means energizing the first drive means in order to reduce the phase difference detected in the azimuth direction and a declination of the directivity of the first and the second antenna with respect to the travelling direction of a radio wave as viewed in the azimuth direction substantially zero, the control means also deriving a ratio of a value of the third function to a value of the fourth function to detect a phase difference in the elevation direction, and determining a quadrant in which the phase difference in the elevation direction is located from positive or negative polarity of values of the third and the fourth function, the control means energizing the second drive means in order to reduce the phase difference detected in the elevation direction and a declination of the directivity of the first and the third antenna with respect to the travelling direction of a radio wave as viewed in the elevation direction substantially zero.

8. An antenna system according to claim 7 in which the first antenna comprises a plane antenna, and the second antenna comprises another plane antenna having a surface which receives an electromagnetic wave and which is disposed on an extension of a wave of the first antenna which receives an electromagnetic wave.

9. An antenna system comprising
an antenna support;
first drive means for driving the antenna support for rotation in an azimuth direction about an axis;
second drive means for driving the antenna support for rotation in an elevation direction about another axis which is perpendicular to the first mentioned axis;
a first and a second antenna disposed on the antenna support and spaced apart from each other in the azimuth direction, the both antennas having directivities which are oriented parallel to each other;
a third antenna disposed on the antenna support and spaced from the second antenna in the azimuth direction and also spaced from the first antenna in the elevation direction, the third antenna having a directivity which is oriented parallel to the directivity of the first antenna;
first detecting means for detecting a value of a first function and a value of a second function which is orthogonal to the first function, each of the first and the second function having a phase difference of a signal received by the second antenna with respect to a signal received by the first antenna as viewed in the azimuth direction as a parameter;
second detecting means for detecting a value of a third function and a value of a fourth function which is orthogonal to the third function, each of the third and the fourth function having a phase difference of a signal received by the third antenna with respect to a signal received by the first antenna as viewed in the elevation direction as a parameter;
and control means for deriving a mean square of values of the first and the second function and for energizing the first drive means to maximize the mean square, the control means also for deriving a mean square of the values of the third and the fourth function and for energizing the second drive means in order to maximize the mean square thereof, the control means subsequently operating to detect a phase difference in the azimuth direction on the basis of a ratio of the value of the first function to the value of the second function and also determining a quadrant in which the phase difference in the azimuth direction is located from positive or negative polarity of values of the first and the second function, the control means energizing the first drive means in order in order to reduce the phase difference detected in the azimuth direction and a declination of the directivity of the first and the second antenna with respect to the travelling direction of a radio wave as viewed in the azimuth direction substantially zero, the control means also operating to detect a phase difference in the elevation direction on the basis of a ratio of the value of the third function to the value of the fourth function and also determining a quadrant in which the phase difference in the elevation direction is located from positive or negative polarity of values of the third and the fourth function, the control means energizing the second drive means in order to reduce the phase difference detected in the elevation direction and a declination of the directivity of the first and the third antenna with respect to the travelling direction of a radio wave as viewed in the elevation direction substantially zero.

* * * * *